United States Patent
Honarvar et al.

(10) Patent No.: US 7,318,224 B2
(45) Date of Patent: *Jan. 8, 2008

(54) VERSIONING IN A RULES BASED DECISION MANAGEMENT SYSTEM

(75) Inventors: Laurence Honarvar, Arnold, MD (US); Steven Fatigante, San Francisco, CA (US); Scott Metzger, El Dorado Hills, CA (US)

(73) Assignee: American Management Systems, Inc., Fairfax, VA (US)

( * ) Notice: Subject to any disclaimer, the term of this patent is extended or adjusted under 35 U.S.C. 154(b) by 706 days.

This patent is subject to a terminal disclaimer.

(21) Appl. No.: 10/358,158

(22) Filed: Feb. 5, 2003

(65) Prior Publication Data

US 2003/0120529 A1    Jun. 26, 2003

Related U.S. Application Data

(62) Division of application No. 09/219,341, filed on Dec. 23, 1998, now Pat. No. 6,546,545.

(60) Provisional application No. 60/076,910, filed on Mar. 5, 1998.

(51) Int. Cl.
    *G06F 9/44* (2006.01)
(52) U.S. Cl. .................. 717/170; 717/100; 706/45; 706/47
(58) Field of Classification Search ............. 717/100, 717/170; 705/2; 707/100, 104.1; 706/40, 706/50, 45, 47
    See application file for complete search history.

(56) References Cited

U.S. PATENT DOCUMENTS

| | | | |
|---|---|---|---|
| 5,177,684 A | 1/1993 | Harker et al. ............... 364/436 |
| 5,182,793 A | 1/1993 | Alexander et al. ............ 395/13 |
| 5,404,292 A | 4/1995 | Hendrickson .......... 364/413.02 |
| 5,481,647 A | 1/1996 | Brody et al. .................. 395/51 |
| 5,504,879 A * | 4/1996 | Eisenberg et al. .......... 707/100 |
| 5,517,405 A | 5/1996 | McAndrew et al. ........ 364/401 |
| 5,574,898 A | 11/1996 | Leblang et al. |
| 5,630,127 A | 5/1997 | Moore et al. ................ 395/615 |
| 5,649,116 A | 7/1997 | McCoy et al. .............. 395/238 |
| 5,687,322 A | 11/1997 | Deaton et al. .............. 395/214 |

(Continued)

FOREIGN PATENT DOCUMENTS

EP    0 205 873 A2    12/1986

(Continued)

OTHER PUBLICATIONS

"Credit Risk Rating at Large US Banks", Treacy et al., 1998 (25 pages). Online retrieved at <http://www.federalreserve.gov/pubs/bulletin/1998/1198leadw.pdf>.*

*Primary Examiner*—Tuan Dam
*Assistant Examiner*—Thuy Dao
(74) *Attorney, Agent, or Firm*—Staas & Halsey LLP

(57) ABSTRACT

A computer implemented process including (a) storing first and second strategy versions for application by a computer-implemented decision management system, the second strategy version being an edited version of the first strategy version and including a function; (b) storing first and second function versions of the function; (c) selecting the stored, second strategy version with one of the first and second function versions; and (d) applying the selected second strategy version.

39 Claims, 24 Drawing Sheets

U.S. PATENT DOCUMENTS

| | | | |
|---|---|---|---|
| 5,696,907 A | 12/1997 | Tom | 395/238 |
| 5,706,406 A | 1/1998 | Pollock | 395/55 |
| 5,721,831 A | 2/1998 | Waits et al. | |
| 5,875,236 A | 2/1999 | Jankowitz et al. | 379/114 |
| 5,930,764 A | 7/1999 | Melchione et al. | 705/10 |
| 5,940,816 A | 8/1999 | Fuhrer et al. | 706/13 |
| 5,953,704 A | 9/1999 | McIlroy et al. | 705/2 |
| 5,956,693 A | 9/1999 | Geerlings | |
| 5,963,910 A | 10/1999 | Ulwick | |
| 5,963,919 A | 10/1999 | Brinkley et al. | |
| 6,009,420 A | 12/1999 | Fagg, III et al. | 706/45 |
| 6,012,043 A | 1/2000 | Albright et al. | |
| 6,012,051 A | 1/2000 | Sammon, Jr. et al. | 706/52 |
| 6,016,477 A | 1/2000 | Ehnebuske et al. | 705/7 |
| 6,016,497 A | 1/2000 | Suver | |
| 6,018,718 A | 1/2000 | Walker et al. | 705/14 |
| 6,021,397 A | 2/2000 | Jones et al. | 705/36 |
| 6,029,138 A | 2/2000 | Khorasani et al. | 705/2 |
| 6,029,149 A | 2/2000 | Dykstra et al. | 705/38 |
| 6,029,153 A | 2/2000 | Bauchner et al. | 705/42 |
| 6,081,798 A * | 6/2000 | Johnson et al. | 706/54 |
| 6,112,190 A * | 8/2000 | Fletcher et al. | 705/36 R |
| 6,115,691 A | 9/2000 | Ulwick | 705/7 |
| 6,119,103 A | 9/2000 | Basch et al. | 705/35 |
| 6,125,359 A | 9/2000 | Lautzenheiser et al. | 706/60 |
| 6,128,599 A | 10/2000 | Walker et al. | 705/14 |
| 6,151,565 A | 11/2000 | Lobley et al. | 703/2 |
| 6,154,736 A * | 11/2000 | Chickering et al. | 706/59 |
| 6,163,604 A | 12/2000 | Baulier et al. | 379/189 |
| 6,182,060 B1 | 1/2001 | Hedgcock et al. | 707/1 |
| 6,188,988 B1 | 2/2001 | Barry et al. | 705/3 |
| 6,234,964 B1 * | 5/2001 | Iliff | 600/300 |
| 6,236,975 B1 | 5/2001 | Boe et al. | 705/7 |
| 6,249,775 B1 | 6/2001 | Freeman et al. | 705/36 |
| 6,275,818 B1 | 8/2001 | Subramanian et al. | 707/2 |
| 6,286,005 B1 | 9/2001 | Cannon | 707/100 |
| 6,292,787 B1 | 9/2001 | Scott et al. | 705/36 |
| 6,317,752 B1 * | 11/2001 | Lee et al. | 707/104.1 |
| 6,330,543 B1 | 12/2001 | Kepecs | |
| 6,546,545 B1 * | 4/2003 | Honarvar et al. | 717/100 |
| 7,076,475 B2 * | 7/2006 | Honarvar | 706/47 |

FOREIGN PATENT DOCUMENTS

| | | |
|---|---|---|
| EP | 0 230 349 A2 | 7/1987 |
| EP | 0 762 306 A2 | 3/1997 |
| EP | 0 849 693 A2 | 6/1998 |
| EP | 0 915 422 A1 | 5/1999 |
| EP | 1 035 485 A2 | 9/2000 |
| EP | 1 073 249 A2 | 1/2001 |
| EP | 1 102 187 A2 | 5/2001 |
| EP | 1 139 257 A1 | 10/2001 |
| WO | WO 97/09666 | 3/1997 |
| WO | WO 97/29447 | 8/1997 |
| WO | WO 97/34246 | 9/1997 |
| WO | WO 98/49641 | 11/1998 |
| WO | WO 98/49642 | 11/1998 |
| WO | WO 98/54667 | 12/1998 |
| WO | WO 99/09503 | 2/1999 |
| WO | WO 99/13427 | 3/1999 |
| WO | WO 99/39290 | 8/1999 |
| WO | WO 00/34910 | 6/2000 |
| WO | WO 00/34911 | 6/2000 |
| WO | WO 00/54186 | 9/2000 |
| WO | WO 00/57312 | 9/2000 |
| WO | WO 00/65502 | 11/2000 |
| WO | WO 00/72268 A1 | 11/2000 |
| WO | WO 01/16851 A2 | 3/2001 |
| WO | WO 01/39090 A1 | 5/2001 |
| WO | WO 01/39589 A1 | 6/2001 |
| WO | WO 01/45012 A2 | 6/2001 |
| WO | WO 01/46876 A2 | 6/2001 |
| WO | WO 01/50306 A2 | 7/2001 |
| WO | WO 01/50336 A1 | 7/2001 |
| WO | WO 01/57756 A1 | 8/2001 |
| WO | WO 01/61598 A1 | 8/2001 |
| WO | WO 01/75754 A1 | 10/2001 |

* cited by examiner

|  | BRONZE | GOLD | PLATINUM |
|---|---|---|---|
| TEST GROUP 1 | STRATEGY TEST CELL 1 | STRATEGY TEST CELL 2 | STRATEGY TEST CELL 3 |
| TEST GROUP 2 | STRATEGY TEST CELL 4 | STRATEGY TEST CELL 5 | STRATEGY TEST CELL 6 |
| TEST GROUP 3 | STRATEGY TEST CELL 7 | STRATEGY TEST CELL 8 | STRATEGY TEST CELL 9 |

FIG. 9

| | | DIMENSIONS | | | | METRICS | | | |
|---|---|---|---|---|---|---|---|---|---|
| OBSERVATION TIME | PERFORMANCE TIME | SEGMENT | TEST GROUP | CATEGORY | REPORT GROUP | DELQ | % CREDIT LINE USED | VALUE | PROFIT |
| 1/98 | 1/98-6/98 | 1 | 1 | BRONZE | A | # | # | # | # |
| 1/98 | 1/98-6/98 | 1 | 1 | BRONZE | B | # | # | # | # |
| 1/98 | 1/98-6/98 | 1 | 1 | BRONZE | C | # | # | # | # |
| 1/98 | 1/98-6/98 | 4 | 2 | GOLD | F | # | # | # | # |

ACCUMULATED PERFORMANCE DATA

FIG. 12

| DATE | TEST | DESCRIPTION |
| --- | --- | --- |
| 1/98...6/98 | T1 | TEST 1 |
| 1/98...6/98 | T2 | TEST 2 |
| 2/98...3/98 | T3 | TEST 3 |
| 3/98...9/98 | T4 | TEST 4 |
| 4/98...10/98 | T5 | TEST 5 |

FIG. 13

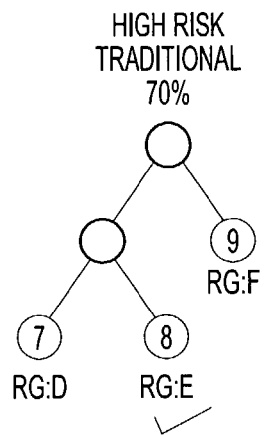
FIG. 14(A)
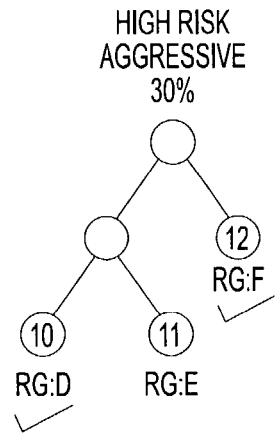
FIG. 14(B)
|  | HIGH RISK | MED RISK | LOW RISK |
|---|---|---|---|
| TRADITIONAL (70%) | 16 | 38 | 16 |
| AGGRESSIVE (30%) | 5 | 20 | 5 |
FIG. 14(C)
|  | HIGH RISK | MED RISK | LOW RISK |
|---|---|---|---|
| TRADITIONAL (70%) | 8 | 38 | 24 |
| AGGRESSIVE (30%) | 2 | 22 | 6 |
FIG. 14(D)

VERSIONING IN A RULES BASED DECISION MANAGEMENT SYSTEM

CROSS REFERENCE TO RELATED APPLICATION

This application is a divisional of application Ser. No. 09/219,341, filed Dec. 23, 1998, which issued as U.S. Pat. No. 6,546,545, on Apr. 8, 2003.

This application claims priority to provisional application 60/076,910, filed Mar. 5, 1998, and which is incorporated herein by reference.

This application is related to U.S. application titled DECISION MANAGEMENT SYSTEM FOR CREATING STRATEGIES TO CONTROL MOVEMENT OF CLIENTS ACROSS CATEGORIES, inventor Laurence Honarvar, U.S. Ser. No. 09/217,017, filed Dec. 21, 1998, which issued as U.S. Pat. No. 6,321,206, on Nov. 20, 2001, and which is incorporated herein by reference.

This application is related to U.S. application titled SIMULTANEOUS CUSTOMER/ACCOUNT STRATEGY EXECUTION IN A DECISION MANAGEMENT SYSTEM, inventor Laurence Honarvar, U.S. Ser. No. 09/216,985, filed Dec. 21, 1998, now pending, and which is incorporated herein by reference.

This application is related to U.S. application titled USE OF ONLINE ANALYTICAL PROCESSING (OLAP) IN A RULES BASED DECISION MANAGEMENT SYSTEM, inventors Steve Campbell, Laurence Honarvar and Traci Showalter, U.S. Ser. No. 09/217,016, filed Dec. 21, 1998, which issued as U.S. Pat. No. 6,430,545, on Aug. 6, 2002, and which is incorporated herein by reference.

This application is related to U.S. application titled PARAMETER HIERARCHY FOR A DECISION MANAGEMENT SYSTEM, inventors Laurence Honarvar, Steve Fatigante and Scott Metzger, U.S. Ser. No. 09/219,340, filed Dec. 23, 1998, now abandoned, and which is incorporated herein by reference.

BACKGROUND OF THE INVENTION

1. Field of the Invention

The present invention relates to a decision management system for creating and applying strategies to manage clients, such as customers, accounts or applicants, of an organization. More specifically, the present invention relates to a decision management system which uses versioning to create, select and apply different strategy versions.

2. Description of the Related Art

A typical organization maintains a significant amount of information about its clients, where clients refer to the customers, accounts or applicants for services of the organization. This information can be effectively used, for example, to increase productivity and reduce costs, while achieving the goals of the organization. Such goals may be to improve profitability and maximize customer value.

For example, a company may sell various products to its customers, and may maintain a significant amount of information relating to its customers. This information can be used to improve many critical interactions with the customers, such as marketing communications, sales calls, customer service, collections, and general relationship management activities.

Consider the following examples.

Assume that a diversified financial services company is trying to leverage its customer base by cross-selling its various products. It currently uses limited internal customer information and credit bureau information to identify existing customers for cross-sell campaigns. For example, they might send "invitations to apply" for a home equity loan to those customers who own a mortgage with the company, and meet a minimum credit bureau score threshold. Imagine how much more powerful their cross-selling efforts would be if they could use information from all of the customers' accounts to offer pre-approved home equity loans to customers where the likelihood of a sale was high, the probability of default was low, and the financial value of that sale was high.

As another example, assume that a regional bell operating company is currently applying only age-based criteria (e.g., "days past due") to its accounts receivable portfolio to identify candidates for its collections department and to handle those customers. The content of the outbound collection notices and phone calls is driven solely by the age and amount of a customer's unpaid balance. Imagine if the company had a tool that helped it select and prioritize collection accounts based on the likelihood of a customer interaction making a bottom line difference. Instead of calling or writing all overdue accounts, they could focus resources on those where the customer interaction would make the greatest difference. In addition, they would save the expense and ill will generated by calling customers who would pay without a collections contact.

As a still further example, assume that a manager of a large telephone customer service center for a super-regional bank has been given only hard-line corporate policy to make decisions about fee and rate concessions. While her service reps attempt to stay to the company line, she is deluged with requests from good customers to talk to the manager. She uses her judgment based on the incomplete information available to her to decide which concessions are appropriate to prevent attrition of profitable customers. Just imagine if the service reps had guidelines that were specific to each customer, based upon customer data that indicates their value to the organization, likelihood of attrition, risk level, and other characteristics. The manager could stand by these guidelines with confidence. There would be no concessions made to unprofitable customers, fewer manager overrides, shorter calls, and reduced attrition of the customers they want to keep.

As diverse as the above examples appear on the surface, they share several common characteristics. Each involves a large customer base and a high volume of customer interactions. Each organization has a substantial amount of accumulated data regarding the characteristics, purchasing/behavior patterns, and profitability of customers (though the data may not yet be well organized or analyzed). Each organization has an opportunity to improve performance substantially by treating different customers and customer groups differently, due to diversity in customer relationships and their potential. In each case, there are desired outcomes that could result from alternative customer interactions (e.g., customer purchases a product, pays an outstanding bill, increases deposit balances), and those outcomes can readily be identified, quantified, and tracked.

Therefore, each of the above examples depicts a business situation that currently is not fully benefitting from decision support and therefore is yielding less than optimal results.

There are software based products in the marketplace which can organize information to make more effective decisions. For example, the American Management Systems (AMS) Strata™ decision support system release 2.0 (hereinafter Strata™ release 2.0) is a software based system which applies predictive modeling techniques to customer data, to thereby generate dramatic improvements in the effectiveness and profitability of customer interactions.

FIG. 1 is a diagram illustrating the general concept of a software-based decision management system, such as Strata™ release 2.0, which applies predictive modeling techniques to customer data.

Referring now to FIG. 1, a software based system 10 receives information from operational and/or customer information systems 20, such as, for example, billing systems, account management systems, credit bureau systems and data warehouses. Software based system 10 prioritizes and tailors customer interactions based on predictive information, specific business rules, and continually evolving decision strategies. Software based system 10 then determines an appropriate action which is to be taken by an action-taking system 30. An appropriate action to be taken could include, for example, a call to a customer, a specific collections procedure or a specific marketing action.

A decision management system as in FIG. 1 can provide superior results, such as increased revenue generation, improved cost-effectiveness and enhanced customer relationships.

FIG. 2 is a more detailed diagram illustrating the operation of the decision management system Strata™ release 2.0.

Referring now to FIG. 2, in step 40, an inbound event is a trigger that is received from one or more external systems to identify that a particular client event has occurred. Such events may be automatically generated due to client behavior or systematically produced at specified time intervals (i.e., monthly). Examples of inbound events include a customer declaring bankruptcy, a credit underwriting decision request, a credit account delinquency, an income statement cycle date, or a routine evaluation date (a periodic, scheduled evaluation).

From step 40, the system moves to step 50, where a client is assigned to a segment. A segment is a grouping of clients based on a characteristic by which the clients will be separated for applying different rules. Generally, a segment is a high level segregation of clients for the purpose of associating largely independent high level strategy. Segments are completely separate groups of clients, for which a unique set of evaluation processes have been defined. For example, a telecommunications company might have a segment for residential customers and another for business customers.

From step 50, the system moves to step 60, where clients are randomly grouped into different test groups for the purpose of applying competing policy rules, strategy, or experiments. Generally, test groups allow for strategy comparison. Just as in research environments, the behavior or outcomes of an experimental "test" population is compared to that of a "control" group that is not exposed to the experimental treatment. A strategist can specify what percentage of the clients should be randomly assigned to each test group. If the strategy associated with a test group is successful, that strategy may later be deployed to a larger percentage of the clients.

From step 60, the system moves to step 70, where inbound events are matched to processes. More specifically, it is defined which processes are invoked in response to each inbound event. For example, different processes are created for a credit card campaign versus a late payment. The order of process execution is also specified.

Processes can be seen as individual decision logic modules which are invoked in response to inbound events. This modular approach to defining decision strategies facilitates logic re-use and the ability to deploy robust strategies required to coordinate customer, account and marketing decisions.

From step 70, the system moves to step 80, where the specific processes for all specific inbound events coming into the system are executed.

From step 80, the system moves to step 90, where the results, or action to be taken, are output.

Therefore, in FIG. 2, based on the type of inbound event(s) received, an appropriate sequence of decision logic modules, or processes, is invoked, where the sequence of decision logic modules is predefined by a strategy analyst.

FIG. 3 is a diagram illustrating an example of a segment being divided into different test groups as in step 60 of FIG. 2. Referring now to FIG. 3, 10% of the segment is randomly assigned to test group 1, 10% of the segment is randomly assigned to test group 2, and 80% of the segment is randomly assigned to test group 3.

FIGS. 4(A) and 4(B) are diagrams illustrating the matching of inbound events to processes in step 70 of FIG. 2. Referring now to FIG. 4(A), for example, when an inbound event 91 is a credit card campaign, the following processes are applied, in order: credit card propensity to buy score 92, risk score 93 and offer selection 94. A result 95 of the applied processes is a determination of whether to send a credit card offer.

Similarly, referring now to FIG. 4(B), for example, when an inbound event 96 is a late payment, the following processes are applied, in order: risk score 97, underwriting treatment 98 and overdraft decision treatment 99. A result 100 of the applied processes is a determination whether to send new underwriting and overdraft codes.

Processes are decision logic modules formed by one or more "mechanisms". Mechanisms can be, for example, decision trees or score models. There are preferably several different mechanisms which are available in the creation of any process. One or more mechanisms are typically grouped into processes when they have comparable objectives (i.e., score cards to predict risk, decision trees to evaluate a credit line, etc.). Generally, the objective is typically reflected in the name of the process itself as defined by the user.

In this conventional decision management system, only a single set of variables is defined. This single set of variables is written over and used for each process. Subsequent processes write over the data stored in the variables from the previous process. For example, referring to FIG. 4, once a risk score is computed by risk score 93, this risk score is stored into a variable which may have stored a score computed by the credit card propensity to buy score 92. Thus, the results of the processes are written over each other into the same set of variables. In this manner, the decision management system has a forced dependency between processes.

FIG. 5 is a diagram illustrating the grouping of mechanisms to processes. Referring now to FIG. 5, when an inbound event 91 triggers a specific process, the specific mechanism to be applied to a client will be determined by the test group into which the client was assigned. This allows for strategy experimentation by defining a common sequence of processes for a given inbound event, but differentiating the actual mechanism that will be invoked for each process depending on the respective test group into which the client was randomly assigned.

If a process only contains one mechanism, no experimentation will take place in that process since every client, regardless of its test group, will be required to use the mechanism. For example, in FIG. 5, no experimentation takes place in the credit card propensity to buy score 92, since this process contains only one mechanism. By contrast, in FIG. 5, experimentation takes place in offer selection 94, since this process includes more than one mechanism. This approach provides the strategy analyst with the flexibility to selectively experiment on each component of the overall strategy, as appropriate.

Processes can include many different types of mechanisms, including decision trees, score models and matrices. Decision trees are the most common.

FIG. 6 is a diagram illustrating a decision tree. A decision tree employs pre-defined logic to route clients to the appropriate endpoint. Generally, a decision tree contains layers of rule-driven decision points, or nodes (starting with a root node at the top of the tree), from which clients are allocated to lower and lower branches of a tree until they ultimately reach an endpoint of the tree (a terminal node). Because decision trees can vary in structure (e.g., number of branches, nodes per branch) and because decision trees can call other decision trees, decision trees provide extensive flexibility for designing client strategies.

The above-described decision management system can allow hybrid strategies to be developed, based on the success of different experiments.

For example, FIG. 7 is a diagram illustrating the effectiveness of creating a hybrid strategy in a decision management system, such as Strata™ release 2.0.

Referring now to FIG. 7, a "test" strategy is applied to test group A, where customers in test group A are divided into two groups, TGA1 and TGA2. Group TGA1 includes all customers less than 40 years old. Group TGA2 includes all customers greater than or equal to 40 years old. A letter is sent to customers whether they are in group TGA1 or TGA2. The end result is that a letter is 60% effective for the customers in TGA1, and 70% effective for customers in TGA2. Assuming that 50% of the population is greater than or equal to 40 years old, and 50% of the population is less than 40 years old, the overall success rate of the test strategy is 65%.

Similarly, a "control" strategy is applied to test group B, where customers in test group B are divided into two groups, TGB1 and TGB2. Group TGB1 includes all customers less than 40 years old. Group TGB2 includes all customers greater than or equal to 40 years old. A call is made to customers whether they are in group TGB1 or TGB2. The end result is that a call is 50% effective for the customers in TGB1, and 90% effective for customers in TGB2. Assuming that 50% of the population is greater than or equal to 40 years old, and 50% of the population is less than 40 years old, the overall success rate of the control strategy is 70%.

An overall comparison of results of test group A (the "test" strategy) versus test group B (the "control" group) indicates that the control strategy is superior, as measured by overall success rate. However, when strategy effectiveness is reported at the comparable path level through the test and control strategies, it is possible to build a new hybrid strategy that will outperform either the test strategy or the control strategy by combining the best performing actions of each strategy. For example, the hybrid strategy would send a letter to all customers less than 40 years old, but call all customers greater than or equal to 40 years old. Such a hybrid strategy should produce an expected overall success rate of 75%, which is higher than either of the test or control strategies.

Such an approach for determining a hybrid strategy could be used, for example, to improve the strategy in offer selection 94 in FIG. 5, where different strategies are applied to different test groups. The formation of a hybrid strategy can significantly increase the effectiveness and profitability of an organization.

Unfortunately, a decision management system such as Strata™ release 2.0 requires technical intervention (for example, physically changing files/databases) if a strategy currently in production needs to be swapped for a new strategy. More specifically, with Strata™ release 2.0, if a strategy currently in production is to be swapped for a new strategy, the current strategy must be copied and archived by a software programmer. In other words, changes to the production environment itself must be made to remove the old strategy and place the new strategy in production. This includes modifying the application to reference a database containing the new strategy.

Further, once a strategy is in production, the strategy can not be preserved for later editing without technical intervention. Technical intervention is required to make a version of the strategy that can be altered and to place the edited strategy into production, by swapping it for the current strategy in production.

These procedures for swapping and editing strategies are time consuming, expensive and cumbersome, since technical intervention is required.

SUMMARY OF THE INVENTION

Accordingly, it is an object of the present invention to provide a decision management system which provides versioning, so that different strategy versions can easily be created, edited and put into production, without requiring technical intervention.

Objects of the present invention are achieved by providing a computer implemented decision management process which (a) stores multiple strategy versions; (b) selects one of the stored strategy versions; and (c) applies the selected strategy version in production and/or simulation, wherein the selecting and applying are performed without technical intervention. Similarly, any version can be selected for editing and/or creation of a new version.

Objects of the present invention are further achieved by providing a computer implemented decision management process which (a) creates a first strategy version; (b) edits the first strategy version, the edited first strategy version being defined as a second strategy version; (c) selects either the first or second strategy version; and (d) applies the selected strategy version in production and/or simulation. The editing, selecting and applying are performed without technical intervention.

Objects of the present invention are also achieved by providing a computer implemented decision management process which (a) creates first and second strategy versions; (b) stores the first and second strategy versions in relational tables; (c) selects either the stored first or second strategy version; and (d) applies the selected strategy version in production and/or simulation by referring to the relational tables.

Further, objects of the present invention are achieved by providing a computer implemented decision management process which (a) creates different strategy versions; (b) stores the strategy versions in relational tables; (c) selects a respective strategy version of the stored strategy versions; (d) applies the selected strategy version by referring to the relational tables, to determine actions to be taken; (e) monitors performance based on the taken actions; and (f) refines the selected strategy version in accordance with the monitored performance.

In addition, objects of the present invention are achieved by providing a computer implemented decision management system which creates different strategy versions, selects a respective strategy version of the created strategy versions without technical intervention, and applies the selected strategy version in production and/or simulation.

BRIEF DESCRIPTION OF THE DRAWINGS

Reference will now be made in detail to the present preferred embodiments of the present invention, examples of which are illustrated in the accompanying drawings, wherein like reference numerals refer to like elements throughout.

FIG. 9 is a diagram illustrating a matrix created in a decision management system, for analyzing data and applying strategies, according to an embodiment of the present invention.

FIG. 12 is a diagram illustrating an example of a row of data having a dimensions part and metrics part, according to an embodiment of the present invention.

FIG. 13 is a diagram illustrating a relational table, such as a look-up table, for a dimension in the row illustrated in FIG. 12, according to an embodiment of the present invention.

FIGS. 14(A), 14(B), 14(C) and 14(D) are diagrams illustrating the operation of a decision management system, according to an embodiment of the present invention.

DESCRIPTION OF THE PREFERRED EMBODIMENTS

Figure 8:
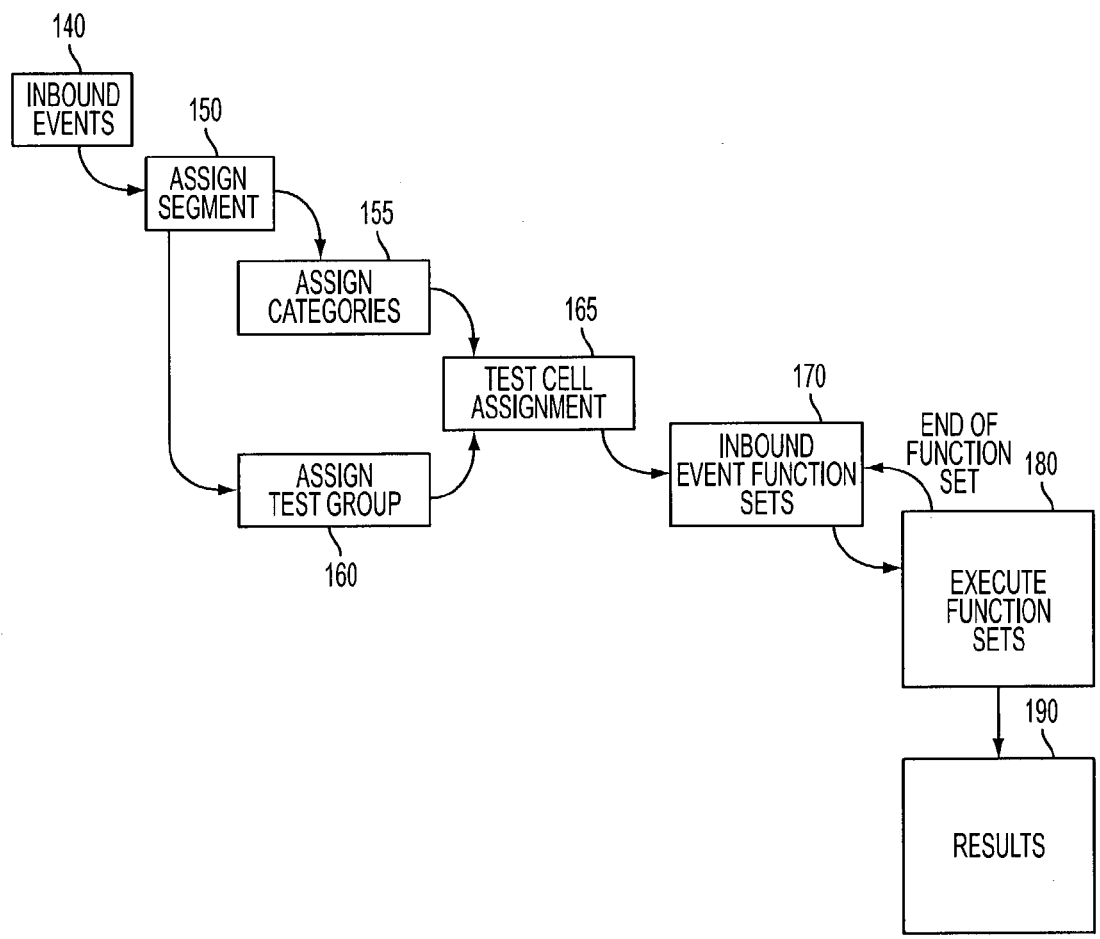
FIG. 8 is a diagram illustrating the functional flow of a decision management system, according to an embodiment of the present invention.

FIG. 8 is a diagram illustrating the functional flow of a decision management system, according to an embodiment of the present invention. Referring now to FIG. 8, in step 140, an inbound event is a trigger that is received from one or more external systems to identify that a particular client event has occurred. Here, a client refers to people or entities which interact with, or do business with, an organization. For example, clients include customers, accounts or applicants for services of the organization.

From step 140, the system moves to step 150, where clients are assigned to different segments. A segment is a grouping of clients based on a characteristic by which the clients will be separated for applying different rules. Generally, a segment is a high-level segregation of clients for the purpose of associating largely independent high-level strategy. Thus, segments are separate groups of clients, for which a unique set of evaluation procedures have been defined. For example, a telecommunications company might have a segment for residential customers and another for business customers. Each segment can have, for example, a separate manager who is the only one with security rights to setup or modify the evaluation procedure for that segment.

From step 150, the system moves to step 155, where each segment is further divided into categories. A category is a grouping of clients as defined by the organization such that it aligns client interaction/value management objectives. In other words, categories represent groups of clients based on how the organization views the clients. For example, a bank may divide clients (such as credit card holders) into the categories of Bronze, Gold, and Platinum, based on how the bank views the credit worthiness of the clients.

From step 150, the system also moves to step 160, where clients are grouped in a random manner into different test groups for the purpose of applying competing policy rules, strategy, or experiments. Thus, steps 155 and 160 can be seen as being performed in parallel and/or having no interdependency.

After steps 155 and 160, each segment has now been divided into test groups and categories. Categories and test groups can be considered to be at the same level in the strategy hierarchy.

From steps 155 and 160, the system moves to step 165, where a matrix is created for each segment, with the categories and test groups on different axes, to create a strategy test cell at the intersection of each category and test group. Here, it is not necessary that a matrix be "physically" created. Instead, the data must simply be organized or arranged in some manner that allows clients to be conceptually represented in a data structure equivalent to a matrix, so that clients can be associated with, or assigned to, strategy test cells.

Figure 1:
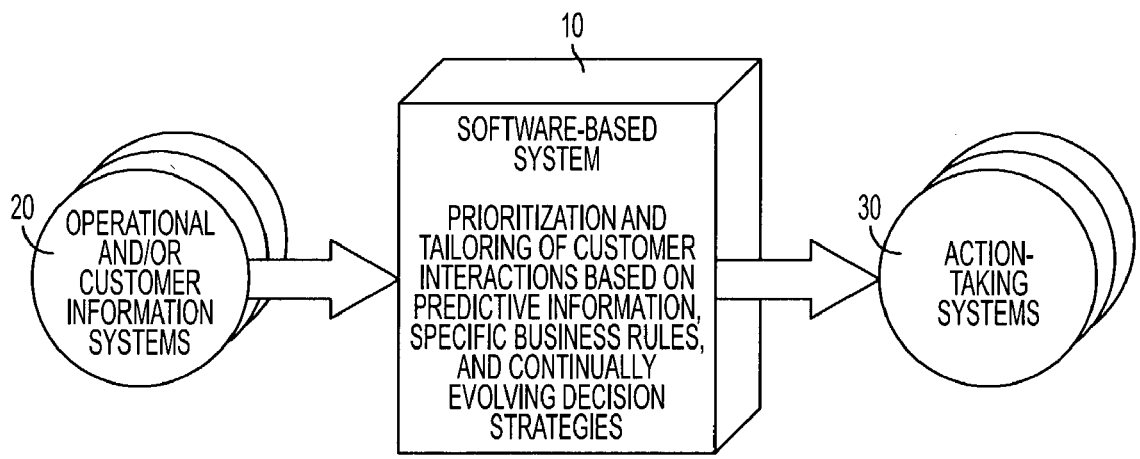
FIG. 1 (prior art) is a diagram illustrating the general concept of a software-based decision management system which applies predictive modeling techniques to customer data.
Figure 2:
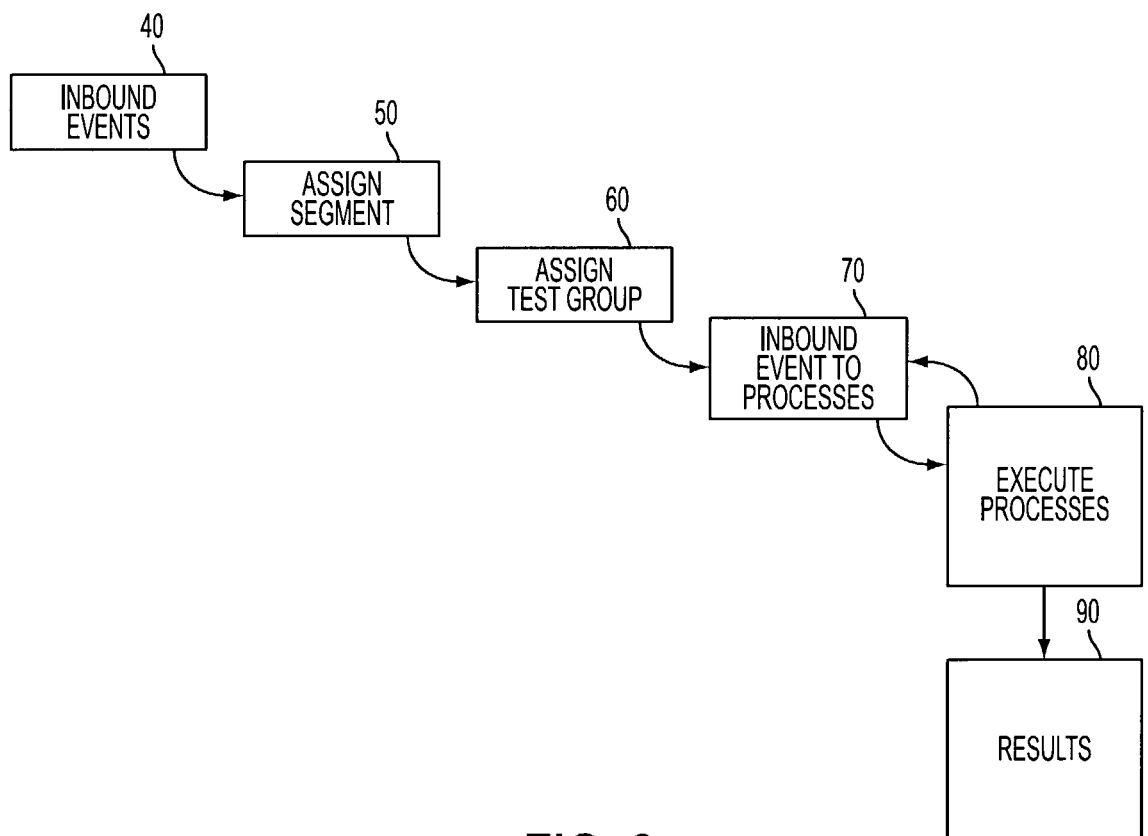
FIG. 2 (prior art) is a more detailed diagram illustrating the operation of a decision management system.
Figure 3:
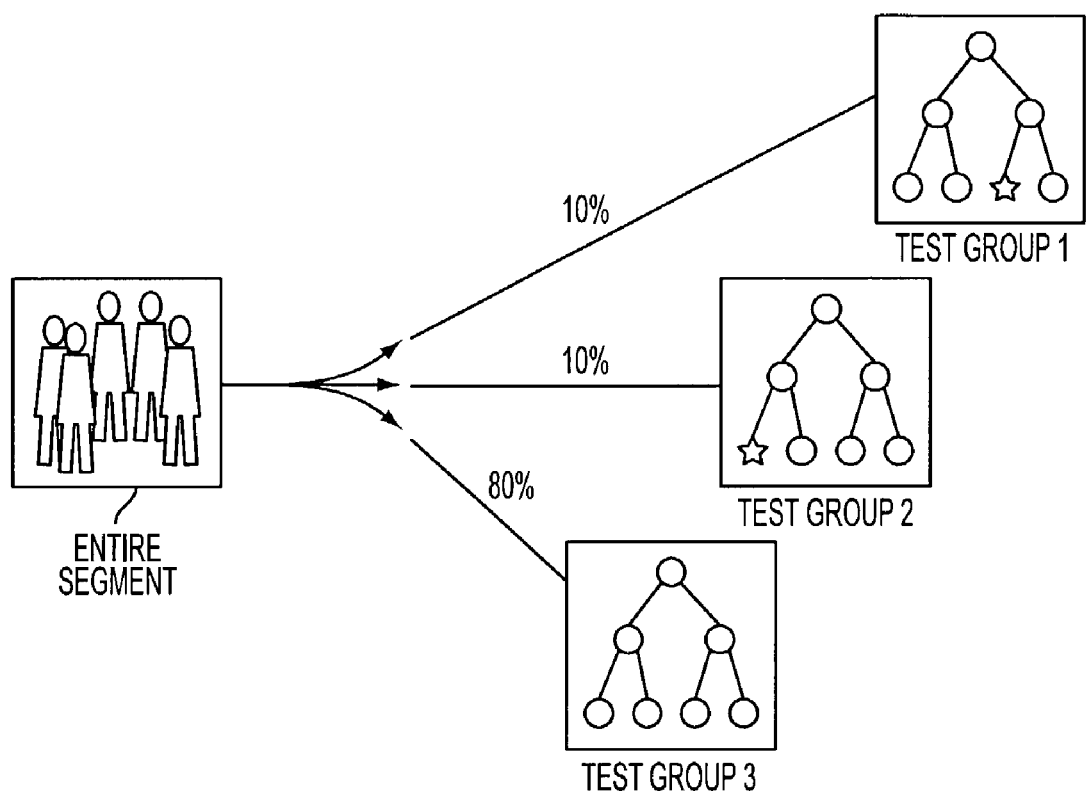
FIG. 3 (prior art) is a diagram illustrating an example of a segment being divided into different test groups in a decision management system.
Figures 4A, 4B:
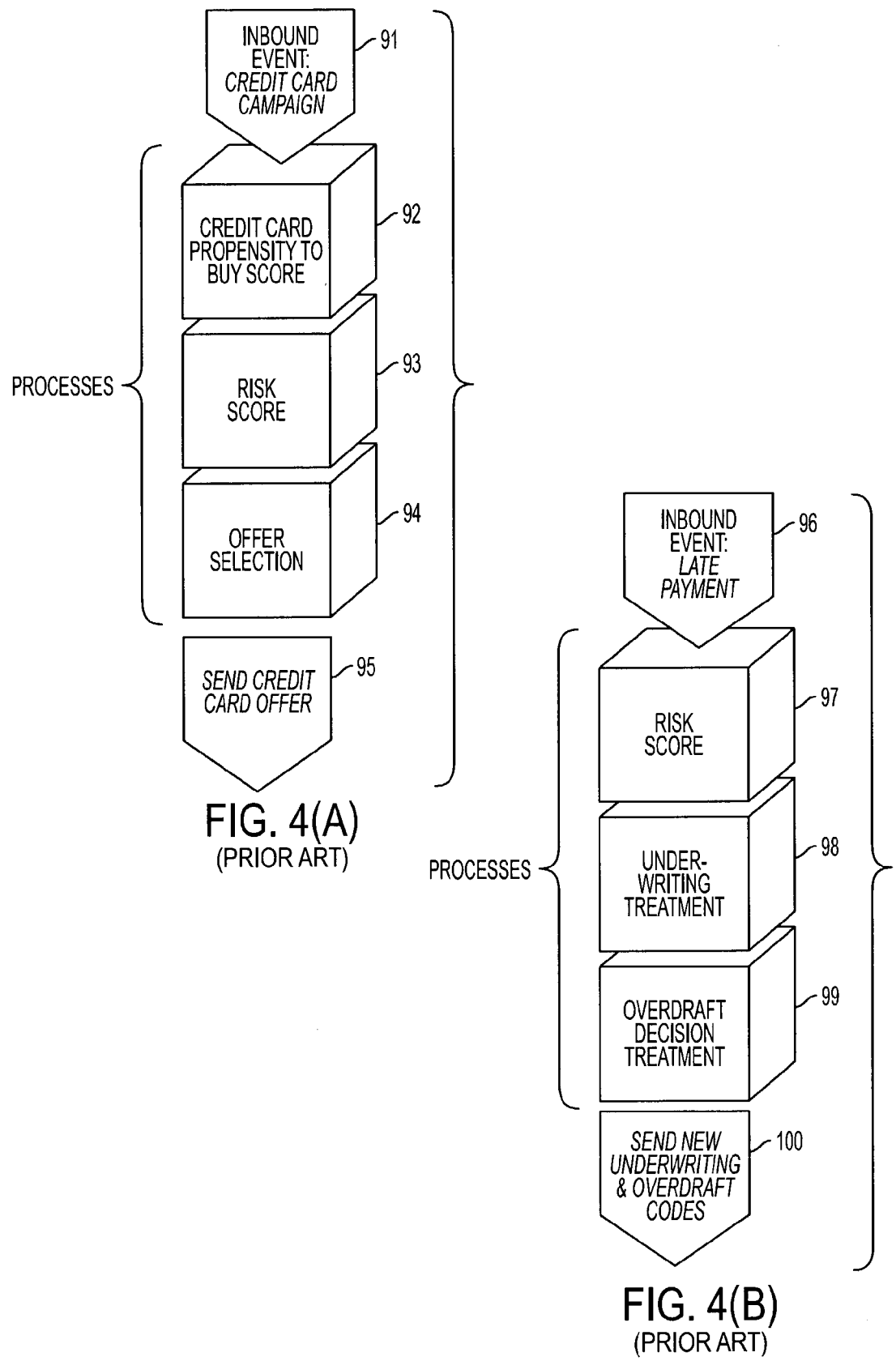
FIGS. 4(A) and 4(B) (prior art) are diagrams illustrating the matching of inbound events to processes in a decision management system.

From step 165 the system moves to step 170, where inbound events are matched to function sets. Here, a function set has a similar meaning as a "process" described, for example, in FIGS. 4(A) and 4(B), but the present invention uses a different terminology.

From step 170, the system moves to step 180, where the specific function sets for one or more specific inbound events are executed.

From step 180, the system moves to step 190, where the results, or action items, are output.

FIG. 9 is a diagram illustrating the creation of a matrix of the categories and test groups for a respective segment, as in step 165 of FIG. 8, according to an embodiment of the present invention. Referring now to FIG. 9, categories of, for example, Bronze, Gold and Platinum are on one axis of the matrix, and test groups 1, 2 and 3 are on the other axis of the matrix. The intersection of a respective category with a respective test group represents a strategy test cell of the matrix.

Then, possibly for each function set, different strategies are designed for different strategy test cells of the matrix.

Figure 5:
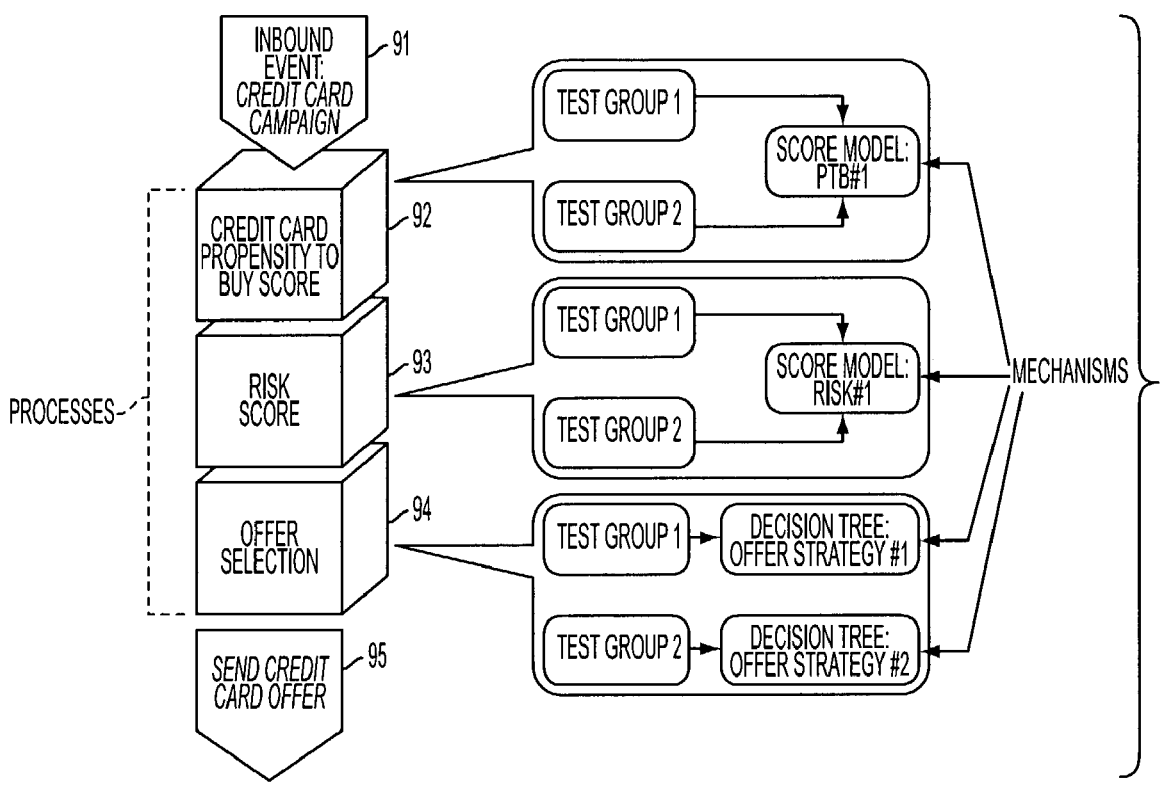
FIG. 5 (prior art) is a diagram illustrating the grouping of mechanisms to processes in a decision management system.
Figure 6:
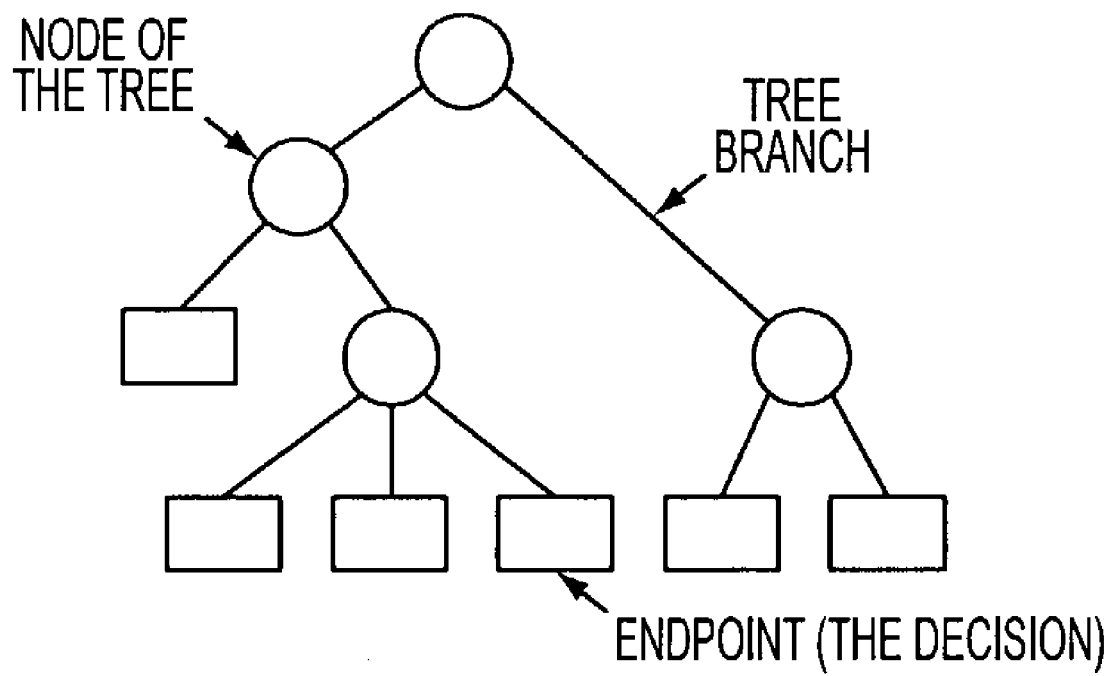
FIG. 6 (prior art) is a diagram illustrating a decision tree.

A function set is formed by one or more functions, where a function can be, for example, a decision tree, a score model, a matrix, a user exit or a list processor. Here, a function has a similar meaning as a "mechanism" described, for example, in FIG. 5, but the present invention uses a different terminology and provides the ability to store each result independently. Moreover, in the conventional system of FIG. 5, user exits and list processors were not available as mechanisms. Thus, generally, the correlation of function sets to functions is similar to that for processes to mechanisms in FIG. 5 but the terminology is different.

Figure 10:
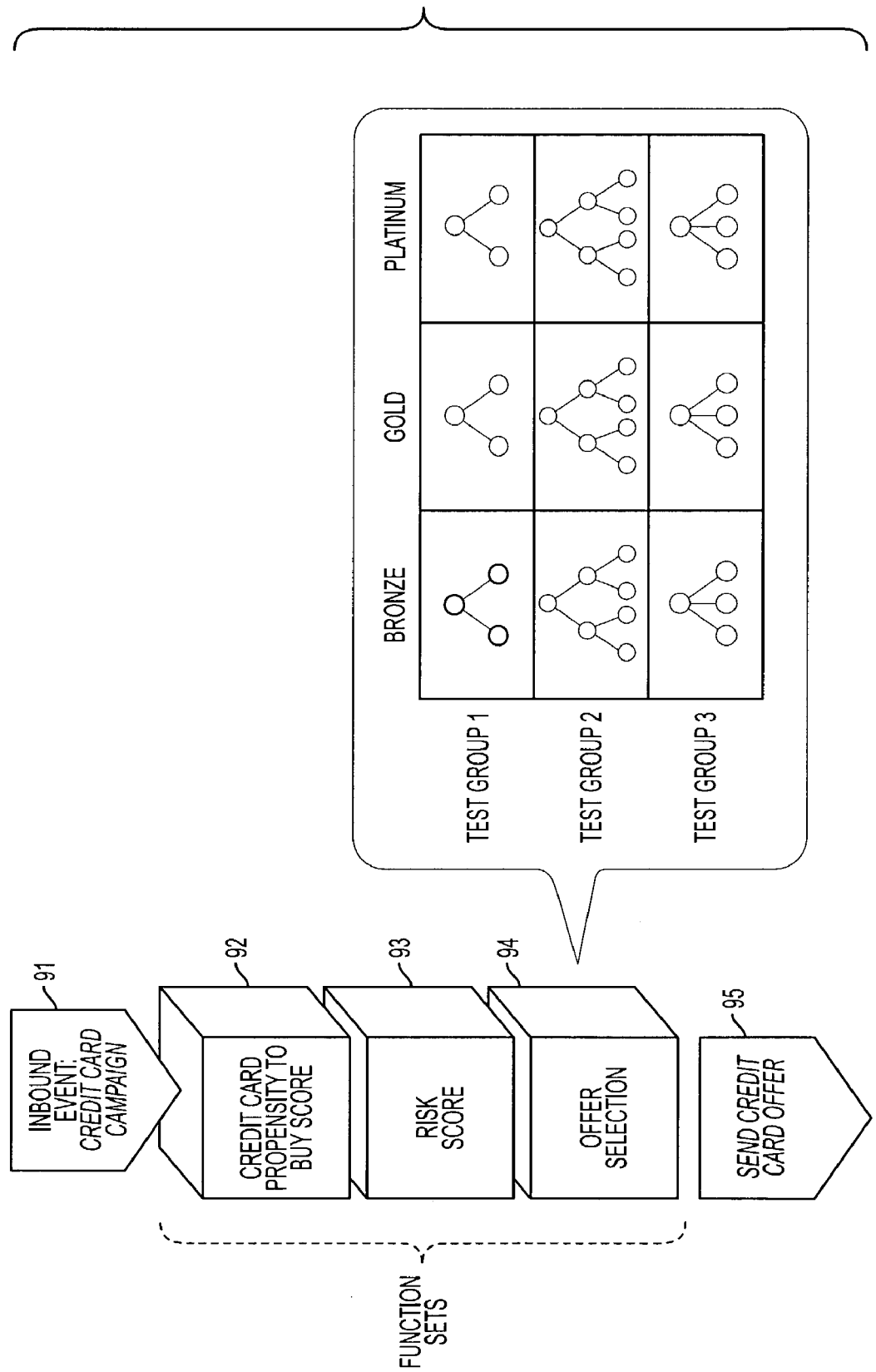
FIG. 10 is a diagram illustrating the correspondence of functions of a respective function set to strategy test cells of a matrix, according to an embodiment of the present invention.

FIG. 10 is a diagram illustrating an example of the correspondence of functions of a respective function set to the strategy test cells of the matrix, according to an embodiment of the present invention. Referring now to FIG. 10, various function sets, including credit card propensity to buy score 92, risk score 93 and offer selection 94, are executed in a user-defined order upon the occurrence of inbound event 91. Offer selection 94 includes a respective function, which is possibly a decision tree, for each strategy test cell.

Preferably, the structure of the decision tree is the same for a respective test group across each category. For example, in FIG. 10, the tree structure in the strategy test cells for test group 1 are the same for each of the Bronze, Gold and Platinum categories. Of course, the actual decisions made at each node and the branching criteria can be different. Similarly, the tree structure in the strategy test cells for test group 2 are the same for each of the Bronze, Gold and Platinum categories. This allows comparison across categories. The same principle holds across test groups for a given category.

Further, it is not necessary for a function set to have a different function for each strategy test cell. Some, or even all, of the strategy test cells for a respective function set can have the same function, depending on the level of testing which is desired to be performed. The specific design of the functions of a respective function set as they correlate to strategy test cells is a matter of design choice, thereby allowing greater flexibility in configuration of the system.

As a strategy is designed, the strategy test cells will be examined against each other. Preferably, there is a common set of metrics for the entire matrix, where the metrics are the appropriate measurements against which to measure the performance of the strategy defined for a segment. Then, it can be determined how well a test group is shifting customers to other categories. For example, it can be determined how quickly test group 1 is moving Bronze customers into the Platinum category in the matrix of FIG. 9.

Although it is preferable to create a data structure which is in "matrix" form for analyzing the movement of clients, the present invention is not intended to be limited to the use of a "matrix." Instead, any data structure which is equivalent to a matrix in providing the required functionality for defining strategy and analyzing the movement of clients will be appropriate. Therefore, generally, many different types of data structures providing an intersection between categories and test groups can be used.

As described above, once clients are placed into categories, the strategy test cells in the matrix are used to design experiments. For example, for the Bronze category, a series of experiments can be designed for each strategy test cell in that category.

In addition, as will be described in more detail below, the decision management system can measure performance so that the overall strategy can be appropriately adjusted to optimize results.

FIGS. 8-10 represent the logical flow of how strategy test cells are created, or assigned. However, the systematic or technical flow may be different. For example, the loop between steps 180 and 170 in FIG. 8 typically executes several function sets. Preferably, all non-test group specific function sets are executed first. These typically include the assessment/execution of predictive algorithms and models. Subsequently, a categorization function set can be executed, to categorize the clients. The categorization function set is generally not test group specific, and often uses the information derived from the function sets that have already been executed. Thereafter, a test cell assignment function set may be executed, to assign clients to specific test cells, or the system user may simply do this implicitly through the definition of rules.

Figure 11:
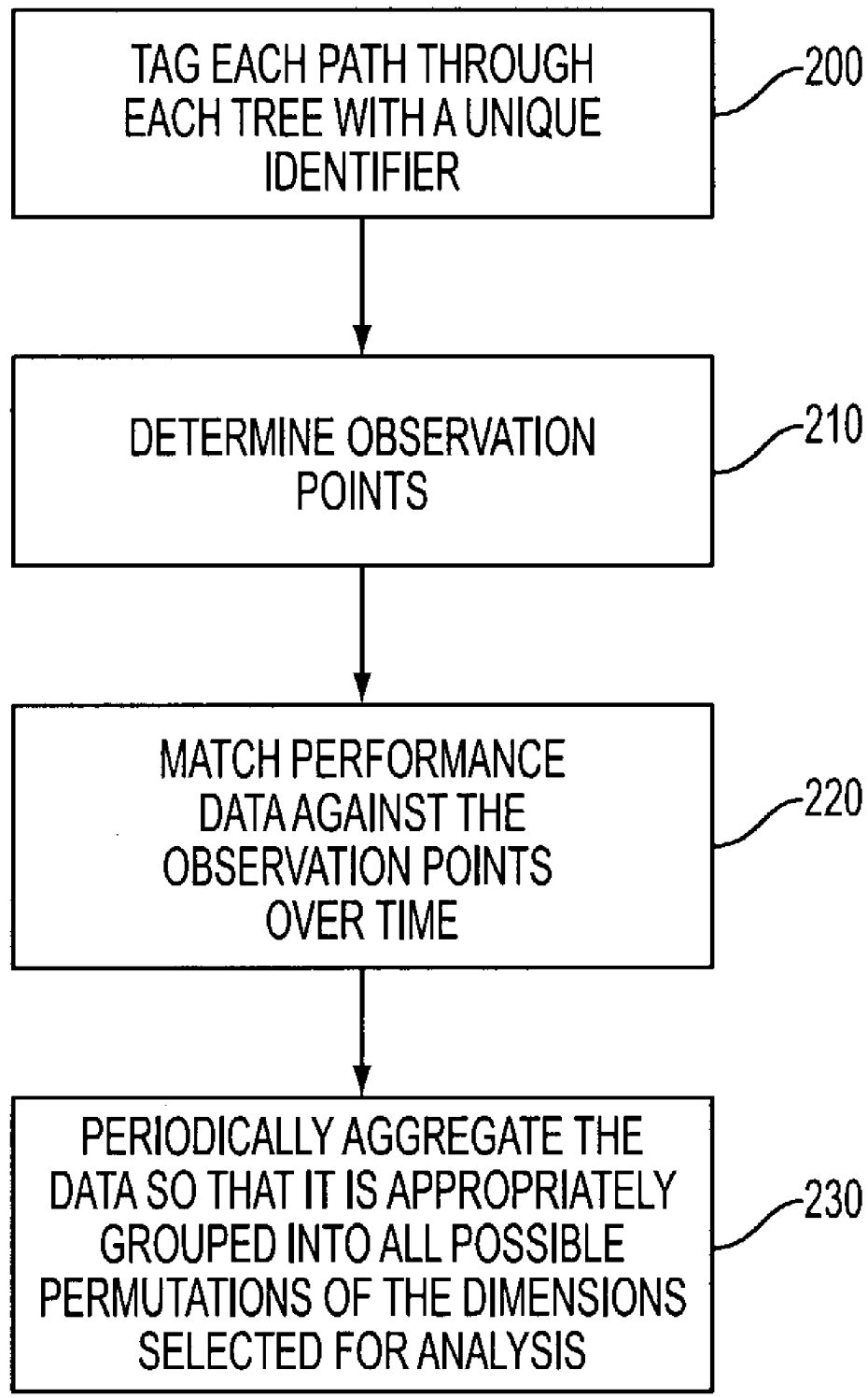
FIG. 11 is a diagram illustrating a data aggregation operation of a decision management system, according to an embodiment of the present invention.

FIG. 11 is a diagram illustrating a data aggregation operation of a decision management system, according to an embodiment of the present invention.

Referring now to FIG. 11, in step 200, each path through each decision tree is tagged with a unique identifier referred to as a report group. Although it is preferable to tag each path through each tree so that complex strategy can be created and refined, it is not necessary for each path to be tagged. Instead, the selection of which paths to tag is a matter of design choice, based on the strategy parameters of the decision management system.

A report group is a tag which identifies a unique path through a policy, strategy or set of rules, and is preferably, although not necessarily, applied to terminal nodes of decision trees. A report group is preferably independent of the test group, so that it can be associated with the same branch of comparable trees in two or more test groups. Report groups are a valuable strategy evolution tool, and enable comparative evaluation of strategy effectiveness for categories within a segment. Categories allow for the analysis of clients who, once being individually evaluated against user-defined criteria, are determined to have similar qualities in consideration of organizational objectives. For example, a category may be defined as all customers who have average current value, high potential value, and a low probability of attrition. Report groups can be placed throughout a decision strategy in order to assure that performance results are accumulated for each respective part of the strategy. The concept of tagging a path to measure performance, as with a report group, is known.

All clients in a given report group should be relatively homogenous, the difference being the test group to which they were randomly assigned and thus the action/decision applied to them based on their test group. Since report groups are independent of test groups, they allow for comparison of the same or alternate categories across experiments (i.e., comparison within the category Platinum of a report group for the test 1 and control test groups). Decision effectiveness reports can then track specified performance metrics (i.e., response rate for marketing, approval rate for underwriting, etc.) by test group for each report group.

A decision management system according to the embodiments of the present invention collectively uses test groups, report groups, categories and user-defined, multi-dimensional decision effectiveness reports to quickly determine the most effective strategy for each segment within a client portfolio.

Referring again to FIG. 11, from step 200 the system moves to step 210, where observation points are determined. More specifically, each time a decision is made about a client, that decision is posted. More importantly, the report group that the client passed through is posted. In addition, what segment, category, test group, etc. is posted. This is referred to as an observation point. An observation point is not intended to be limited to posting any specific criteria, so that a strategy analyst has flexibility in determining what data should be posted. Similarly, it is not limited to only be triggered by decisions. Instead, for example, a score model or matrix invocation could trigger an observation.

From step 210, the system moves to step 220, where performance over time for observation points is accumulated, and matched against the observation points. Generally, an observation point is a snapshot of a point in time, and has dimensions across which analysis of the data can be performed. A specific client can have multiple observation points. Therefore, in step 210 in FIG. 11, observation points for a client are noted. Then, in step 220, for each client, performance data is matched against observation points. For example, once a month, performance data for a client may be obtained. This performance data is then matched, or correlated, to the appropriate observation points for each account and/or customer.

For example, on Jan. 1, 1998, assume that a decision is made to increase a client's credit limit by $500. This information is stored as an observation point. Data stored as part of the observation point's dimensions may be, for example, client ID, what segment the client was in, what category the client was in, what test group the client was in and what report group the client was in when that decision was made.

On Jan. 31, 1998, Feb. 31, 1998, Mar. 31, 1998, etc., some additional performance data may be obtained. For example, how much of the credit line increase was used? Did the client go delinquent on the account? What was the current value of the customer? What was the profitability? For example, over the course of a year, twelve (12) sets of performance data may be obtained for this client, each including all of these performance metrics.

Over the course of the year, other decisions may be made. For example, a mortgage offer may have been made to the client. This mortgage offer would represent a new observation point. From this time on, performance data would be accumulated for that observation point. In January, 1999, observation points made in January 1998, can possibly be rolled off, depending on the user's desired parameters dictating how long performance is to be retained. Therefore, for example, the performance of the January, 1998, credit line increase decision has been tracked for twelve months, but it will not be tracked anymore. However, performance data will still be accumulated for the observation point where the mortgage offer was made. How long to accumulate and maintain performance data for a specific observation point is a matter of design choice. Common performance data may be captured once for multiple observations.

From step 220, the system moves to step 230, where the collected performance data is periodically aggregated and grouped, preferably, into all possible permutations of the dimensions noted when the observation point was taken and selected for analysis. Generally, in step 230, it is not desirable to report on a specific client, but how well a specific test group or strategy performs. For example, the data is preferably aggregated to determine the performance of segment 1, test group 4, bronze customers, report group B. An aggregate performance data measure can then be determined for all clients meeting this criteria. In this manner, it can be evaluated how well a certain test group or category performed, instead of how well a specific client performed. Thus, strategy performance can be evaluated, instead of individual client performance.

As a result of the aggregation of data, a row of data having two parts, dimensions and metrics, can be created. Dimensions are the ways the organization wants to view the performance results. For example, segment and category would be dimensions. Aggregating the data in a row allows us to view the intersection of the different points in the matrix created in step 165 of FIG. 8. For example, by aggregating the data, we can view all the metrics, or results, associated with Bronze, test group 2. The user can interactively select which dimensions to apply in filtering the results.

Therefore, the dimensions of the rows should preferably provide all the different ways in which it is intended to analyze the performance data. The dimensions would likely include combinations that allow data relating to the category assignment matrix to be viewed, and combinations that allow data relating to specific strategy paths to be viewed.

For example, a row might include the dimensions of segment, test group, category and report group. The metrics for that row should include data relating to those dimensions, such as, for example, delinquency, % credit line used, value, profit. Therefore, by storing dimensions as a "key" to the data, a "solution set" of metrics is obtained which matches that key.

Each row can be thought of as being a unique intersection of values for all dimensional columns. Preferably, the metrics associated with those dimensions are appropriately aggregated for every possible permutation of all of the dimensions. For example, one row can include the dimensions of segment 1, test group 1, category 1, report group 1, and the aggregate results that meet these dimensions. The next row may include the dimensions of segment 1, category 1, test group 1, report group 2, and the aggregate results that meet these dimensions.

When performing the aggregation operation, all possible permutations of dimensions are preferably determined. Then, the results of clients meeting these dimensions should be matched to these permutations.

For example, FIG. 12 is a diagram illustrating an example of a row of data having a dimensions part and metrics part, according to an embodiment of the present invention. Referring now to FIG. 12, each row includes the dimensions of observation time, performance time, segment, test group, category and report group. Preferably, a row is created for each possible permutation of the dimensions. The metrics of delinquency, % credit line used, value and profit are then matched to the various permutations of the dimensions. Generally, the metrics for a specific row should indicate the consolidation all the individual client data of all the individual clients meeting the values of the dimensions identifying that row. Therefore, the data for each specific client is not being reviewed, but instead the performance of a specific strategy is being reviewed.

The use of time dimensions, such as the dimensions of observation time and performance time, allows the movement between categories to be examined over time. Additionally, time allows for trend analysis and selective inclusion of performance points to access when a strategy was performed well/poorly.

Preferably, relational tables, such as, for example, look-up tables, are used for each of the dimensions, to appropriately and descriptively access the data, and to allow a system user to easily change strategy aggregation parameters which are subsequently reflected in the tables.

For example, FIG. 13 is a diagram illustrating a look-up table for the test group dimension in the row illustrated in FIG. 12, according to an embodiment of the present invention. Referring now to FIG. 13, the look-up table includes a date column (DATE), a test group identifier column (TEST), and a description column (DESCRIPTION). A look-up table could be created for each of the dimensions of the row illustrated in FIG. 12.

Thus, the rows of data can be considered to be a data structure which is accessed to track the performance of a category or other dimension.

The data aggregation operation in FIG. 11 aggregates the data in preparation for using well-known online analytical processing (OLAP) techniques and technology. Here, OLAP is a known technology that allows for the multi-dimensional analysis of data such that results can be supported in a manner consistent with explaining their significance or inter-relationships. OLAP is based upon the use of multi-dimensional data structures and aggregated data to ensure acceptable performance in leveraging the technology. It is in contrast to online transactional processing (OLTP) in that OLAP focuses on supporting analysis versus the support of operational systems.

The data as aggregated by the operation in FIG. 11 can be used by OLAP to determine the effectiveness of various strategies. For example, in the above-described manner, various strategies can be tested to determine whether the strategies are successful in moving clients to more desirable categories.

Aggregate comparisons of test and control strategies can mask important differences in strategy effectiveness. For example, two strategies may appear equally effective in terms of aggregate performance while they actual outperform each other for different segments of the client portfolio. This is most easily explained by way of the hybrid approach illustrated in FIG. 7.

Figure 7:
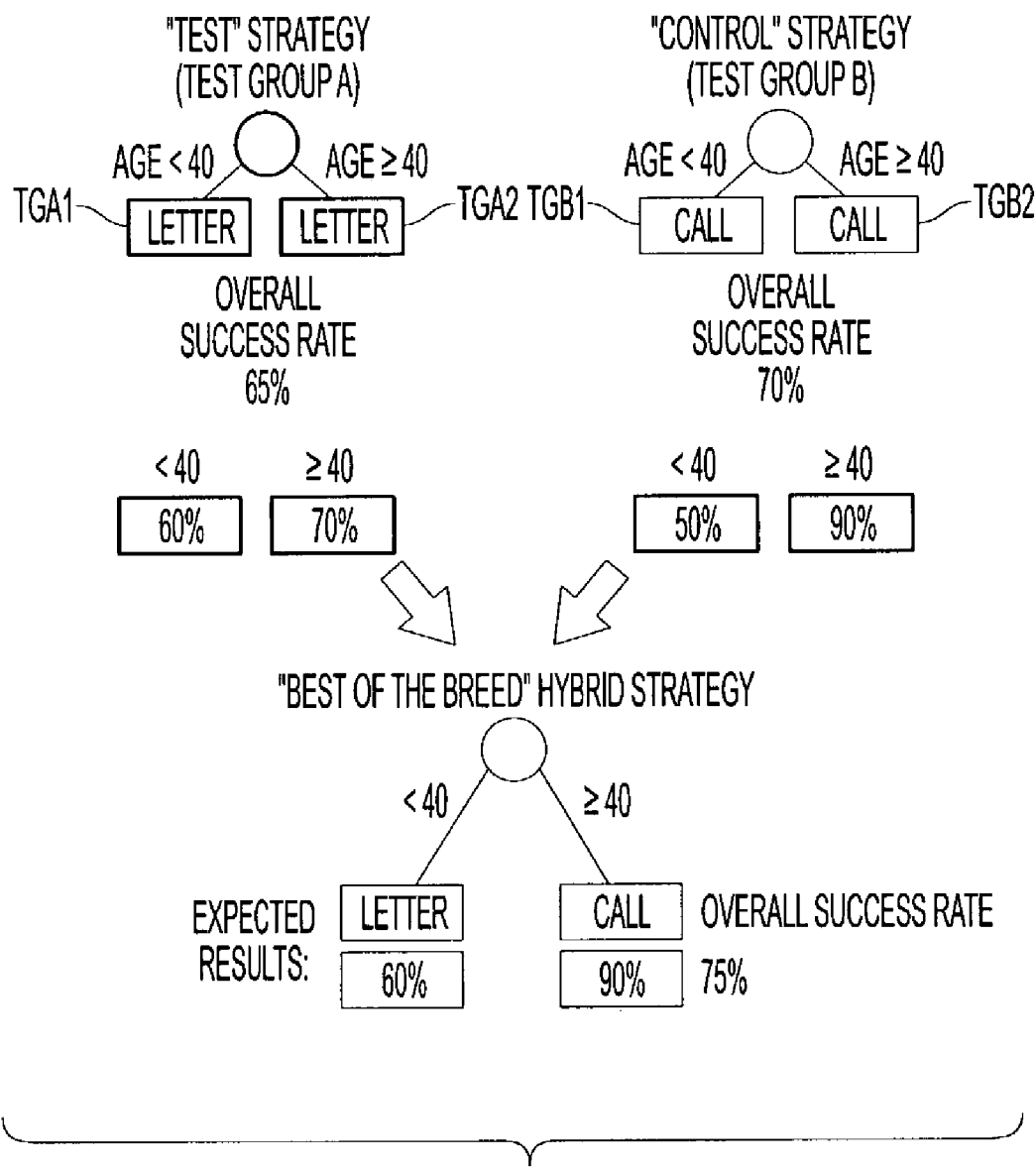
FIG. 7 (prior art) is a diagram illustrating a hybrid strategy in a decision management system.

Referring now to FIG. 7, an overall comparison of the results for the test strategy versus control strategy would indicate that the control strategy was superior (as measured by overall success rate). However, when strategy effectiveness is reported at the further segmented report group level (i.e., for each comparable path through test groups), it is possible to build a new hybrid strategy that will outperform either test or control by combining the best performing actions of each strategy.

In creating the infrastructure to create hybrid strategies, decision trees should preferably have the same structure for each test group, but could have different actions or decisions associated with each node. Then, a report group, because the tree structures are identical, can allow two or more identical paths to be associated with each other, independent of the test group. For example, instead of simply comparing the overall performance of test group 1 to test group 2, the same path in test group 1 can be compared to the same path in test group 2. This allows microanalysis of the strategy test cells, to determine which paths are performing very well or very poorly.

According to the above embodiments of the present invention, clients can be randomly assigned to a test group. Each test group has associated with it one or more strategies typically defined using decision trees. Each possible path through a decision tree can be "tagged" and the performance of all clients that went down that path can be monitored.

Report groups and categories can be considered to be different types of "tags." Report groups are preferable to tag paths in a single function set and provide measurement of just that path across all test groups/trees used in the respective function set. Categories provide similar functionality as report groups, but at an aggregate level. More specifically, the performance of a category is tracked as the cumulative performance of report groups assigned in strategy paths that were traversed after the assignment of the category.

Report groups define unique paths through a strategy and span test groups such that performance of path A in test group 1 can be compared with path A in test group 2. The rules associated with a given path should preferably be the same across two test groups, but the decisions assigned at the end of the path may vary by test group. As a result, the strategy experimentation function can be accelerated by not simply comparing two or more test groups to determine the best performer, but rather by measuring individual paths across two or more test groups such that a new hybrid strategy can be developed using the best performing paths of each test group.

As an example, assume that the following function sets will be executed in order: CATEGORY ASSIGNMENT, APPROVE/DECLINE DECISION, and CREDIT LIMIT ASSIGNMENT. In CATEGORY ASSIGNMENT, there are three paths used to segment customers into three categories: HIGH RISK, MEDIUM RISK and LOW RISK. Two test groups are then defined: TRADITIONAL (70%) and AGGRESSIVE (30%). The CATEGORY ASSIGNMENT tree is the same for both test groups since categories span test groups and vice-versa (i.e., a many to many relationship). However, the trees associated with the APPROVE/DECLINE and CREDIT LIMIT ASSIGNMENT function sets will have different decisions, depending on the test group.

For APPROVE/DECLINE, there are three paths through the decision tree, defined by report groups A, B and C.

Similarly, there are three paths through the decision tree for CREDIT LIMIT ASSIGNMENT, defined by report groups D, E and F.

FIGS. 14(A), 14(B), 14(C) and 14(D) are diagrams illustrating the operation of a decision management system as applied to CREDIT LINE ASSIGNMENT, according to an embodiment of the present invention.

Referring now to FIGS. 14(A) and 14(B), as described above, 70% of customers are assigned to the test group TRADITIONAL, and 30% of customers are assigned to the test group AGGRESSIVE. Each test group has the same decision tree structure. There are three paths through the decision tree for CREDIT LIMIT ASSIGNMENT, defined by report groups D, E and F.

A decision management system according to the embodiment of the present invention provides the ability to measure the performance of each report group across test groups. For example, while at an aggregate level, assume that TRADITIONAL produced more profit than AGGRESSIVE. However, assume that the path/decision associated with report groups D and F in AGGRESSIVE generated more profit than the same path/decisions associated with report groups D and F in TRADITIONAL, as indicated by the "check mark" in FIG. 14(B) next to report groups D and F.

However, assume that report group E in TRADITIONAL was more profitable than the comparable paths/decision in AGGRESSIVE, as indicated by the "check mark" in FIG. 14(A) next to report group E. Rather than simply increasing the percentage of people assigned to TRADITIONAL, a new hybrid strategy can be defined and associated with a test group that uses the decision assigned for report groups D and F in AGGRESSIVE in conjunction with the decision assigned to report group E in TRADITIONAL. This new test group will be called, for example, TRADITIONAL_2. The overall profitability of TRADITIONAL_2 will be higher than either TRADITIONAL and AGGRESSIVE since it contains the best performing paths/decisions of each test group for the CREDIT LINE ASSIGNMENT function set. A similar procedure would be performed within APPROVE/DECLINE using report groups A, B and C, to develop an improved hybrid strategy for APPROVE/DECLINE.

To continue the example and relate it to categories, the performance of TRADITIONAL can be examined over time in moving more people into the LOW RISK category from the HIGH RISK category. This can be compared to the effectiveness of AGGRESSIVE at achieving the same objective (i.e., over time, moving more people into the LOW RISK category).

For example, FIGS. 14(C) and 14(D) each represent a matrix having the categories of HIGH RISK, MEDIUM RISK and LOW RISK on one axis, and the test groups TRADITIONAL and AGGRESSIVE on the other axis. Thus, these matrices have the same axes and values on the axes as the matrix in step 165 of FIG. 8. However, the matrix in step 165 in FIG. 8 is used to allocate customers to strategy test cells, whereas the matrix in FIGS. 14(C) and 14(D) are used to leverage performance metrics for each strategy test cell. More specifically, the matrices in FIGS. 14(C) and 14(D) are for viewing the movement of clients between categories. By contrast, the matrix in step 165 of FIG. 8 is for actual strategy execution versus strategy reporting.

As an example, assume that FIG. 14(C) represents a matrix based on data for January 1997, while FIG. 14(D) represents a matrix based on data for December 1997. As can be seen from comparing FIGS. 14(C) and 14(D), both test groups were effective in moving customers from the HIGH RISK category into the MEDIUM RISK and LOW RISK categories. Therefore, the company might consider permanently implementing these test group strategies. Moreover, hybrid strategies can be developed from test groups in the same category and possibly across categories. In this manner, strategies can be tested and implemented to move customers appropriately into different categories.

The effectiveness measurement of the categories is a direct function of aggregating the performance associated with the report groups assigned to the clients for the APPROVE DECLINE and/or CREDIT LIMIT ASSIGNMENT function sets.

A decision management system, according to embodiments of the present invention, can allow a system user to take a complete set of strategies and/or a specific function, function set, or any portion of the overall strategy, and store it as a separate version for use in either production and/or simulation. This process of storing different versions of a strategy is referred to as "versioning". Thus, versioning allows different strategies to be referenced, edited and defined for production and/or simulation. With multiple versions of strategies, the system user has the ability to change parameters for a given set of strategies for subsequent use in simulation or production while maintaining the integrity of the current version of the strategy being used in production.

To provide a versioning capability for a complete set of strategies, a version level is interjected in the definition hierarchy of the system. For example, the definition hierarchy typically has a system level and a segment level, where the system level is at a higher level than the segment level. For example, when at the system level, the definition hierarchy is referring to the particular systems which communicate with the decision management system, where these systems are defined by the system user. Examples of systems include, for example, underwriting, collections and marketing systems. When at the segment level, the definition hierarchy is referring to a particular segment within the associated system. For example, an underwriting system might have the segments of indirect, branch and pre-approved. In a relationship management system, segments might be defined by geographic regions since consumer behavior varies across geographic location. The user determines how a system will be divided into segments.

By using a versioning level below the system level in the definition hierarchy, each complete strategy can be created, stored, selected and applied in either production or simulation as a different strategy version.

The Strata™ release 2.0 decision management system, described in the Background of the Invention section, also has a definition hierarchy with a system level higher than a segment level. However, a decision management system according to the embodiments of the present invention differs from that in Strata™ release 2.0 by interjecting a version level between the system level and the segment level. More specifically, a decision management system, according to embodiments of the present invention, has a definition hierarchy of system/version/segment.

Figure 15:
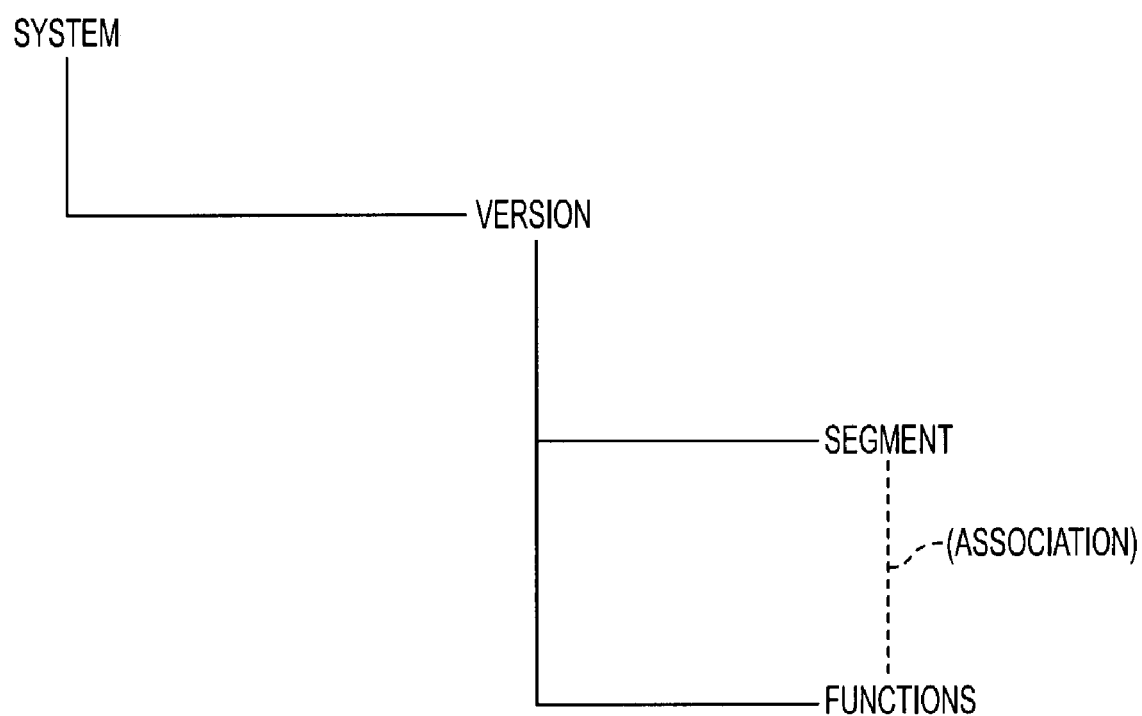
FIG. 15 is a diagram illustrating a definition hierarchy of a decision management system, according to an embodiment of the present invention.

FIG. 15 is a diagram illustrating the definition hierarchy of a decision management system, according to an embodiment of the present invention. Referring now to FIG. 15, a version level is interjected between the system level and the segment level. A function level is shown as being under the version level and at the same level as segment. Thus, in this embodiment, different functions are associated with different versions and functions are associated with specific segments. Levels and associations provide the user with the ability to organize the components of a strategy. The use of the various levels of system, version, segment and function for defining the system hierarchy would be understandable to a person of skill in the art.

Strategies are typically entered by a system user via a terminal, and stored in relational tables. A decision engine can then apply and execute the strategies by referring to data extracted from the relational tables.

Figure 16:
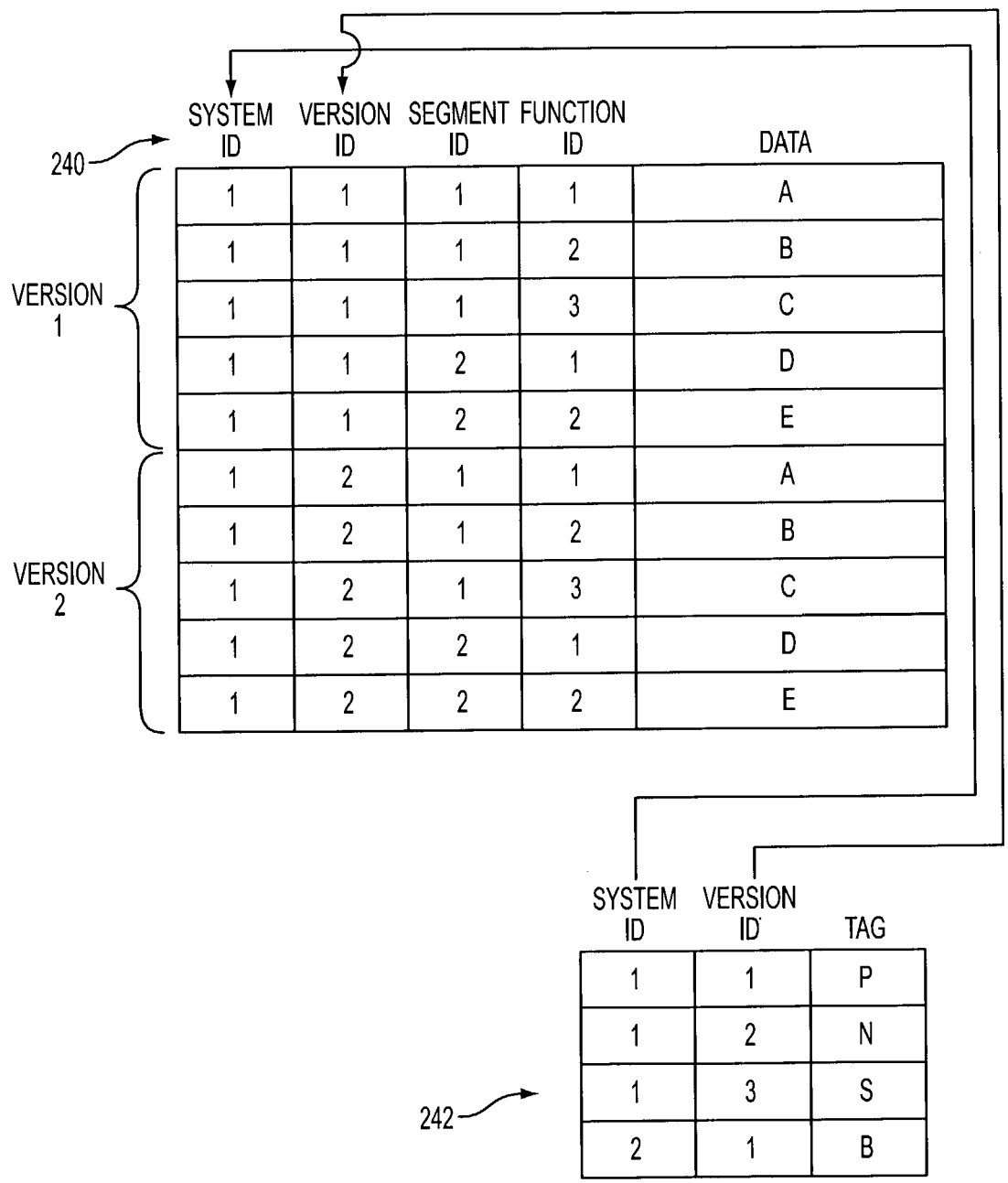
FIG. 16 is a diagram illustrating the use of tables in a relational database/data model to create and apply different strategy versions, according to an embodiment of the present invention.

FIG. 16 is a diagram illustrating the use of tables to reference different strategy versions, according to an embodiment of the present invention. Referring now to FIG. 16, a look-up table 240 in the relational model has the columns of system ID, version ID, segment ID and function ID, to associate various groupings of systems, versions, segments and functions as keys to the data comprising a specific function. For example, the first row in table 240 identifies a grouping consisting of the first system, the first strategy version for the first system, the first segment of the first system, and the first function in the first segment of the first system. Here, the function ID refers to specific functions in the corresponding grouping of system, version and segment. For example, function ID 1 may refer, for example, to a specific decision tree in system 1, version 1, segment 1. The data column in table 240 provides data defining the corresponding function. For example, referring to the first row in table 240, function ID 1 and data A together define a specific function in system 1, version 1, segment 1.

Moreover, each strategy version can be used for either production, simulation, both or neither. Versions used for neither are often maintained as archives of prior simulation/production versions. This is significant in that a strategy may no longer be in production by the time strategy performance becomes fully available. For example, table 242 in FIG. 16 has the columns of system ID and version ID as keys to the table. Based on the keys, the corresponding tag is maintained in the tag column by the user through a graphical user interface (GUI). (The use of a GUI will be discussed in more detail later.) More specifically, the tag column indicates whether the strategy version for a key combination is to be used for production (P), simulation (S), both (B) or neither (N). For example, referring to row one of table 242, strategy version 1 is to be used in production in system 1 (which may be, for example, a collections system). Referring to row 4 of table 242, strategy version 1 is to be used for both production and simulation in system 2 (which may be, for example, a loan originations system).

Therefore, FIG. 16 demonstrates how a version is inserted in the definition hierarchy between the system level and the segment level in a relational data model supporting decision management. In the example of FIG. 16, it can be seen that version 2 is essentially a copy of version 1. However, in other embodiments, version 2 can be different from version 1 by, for example, using different data in the data column for version 1 as compared to version 2. More specifically, version 2 can evolve independently from version 1 once version 1 has been used to create version 2.

Therefore, the decision management system allows different strategy versions to be created and tagged for either production, simulation, both or neither.

While FIG. 15 illustrates a versioning level interjected between the system level and the segment level, the present invention is not intended to be limited to this specific example. Instead, versioning can be applied to virtually any level in the definition hierarchy.

Figure 17A:
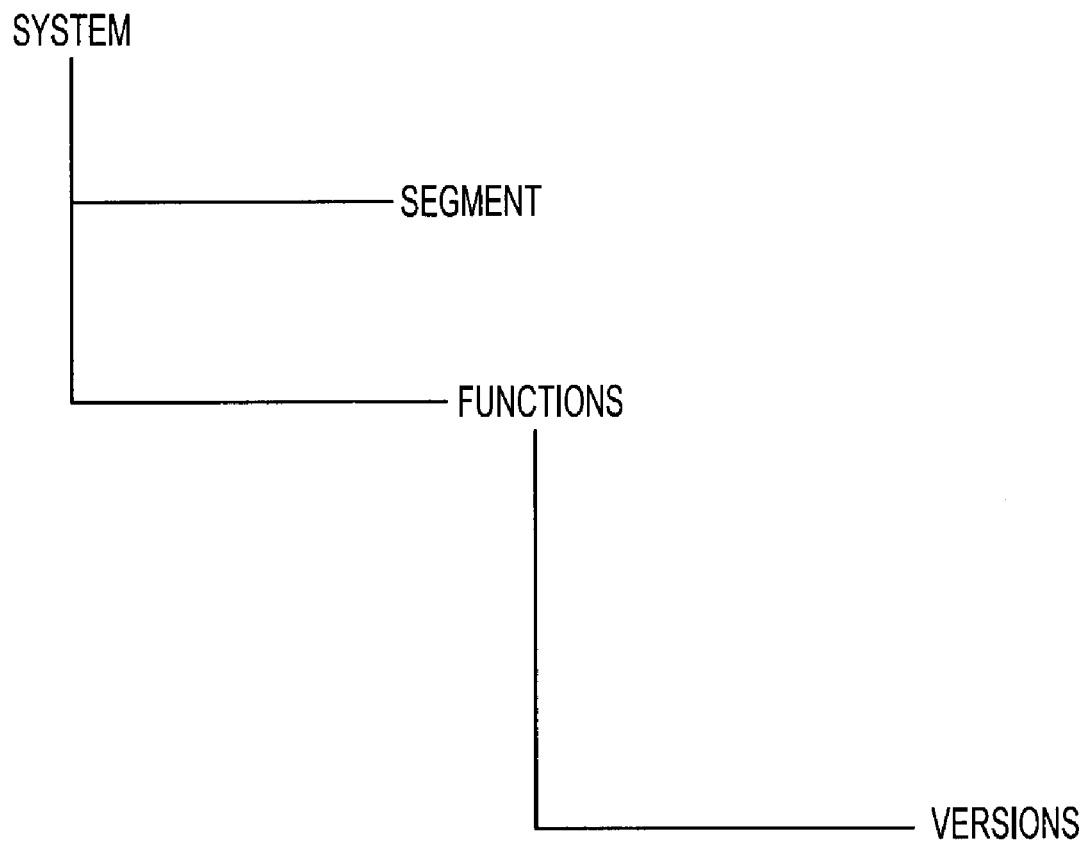
FIG. 17(A) is a diagram illustrating a definition hierarchy of a decision management system, according to an additional embodiment of the present invention.

For example, FIG. 17(A) is a diagram illustrating a definition hierarchy having the version level beneath the system level and the function level, according to an embodiment of the present invention. Although the definition hierarchy in FIG. 17 may be advantageous in some circumstances, it also increases complexity. In many cases a more efficient and useful approach appears to be interjected the versioning level between the system level and the segment level, as previously discussed. Versioning below the function leverages the same approach as versioning below the system, but requires that the user select the appropriate version of each function before being able to place a strategy for a system in simulation/production.

Figure 17B:
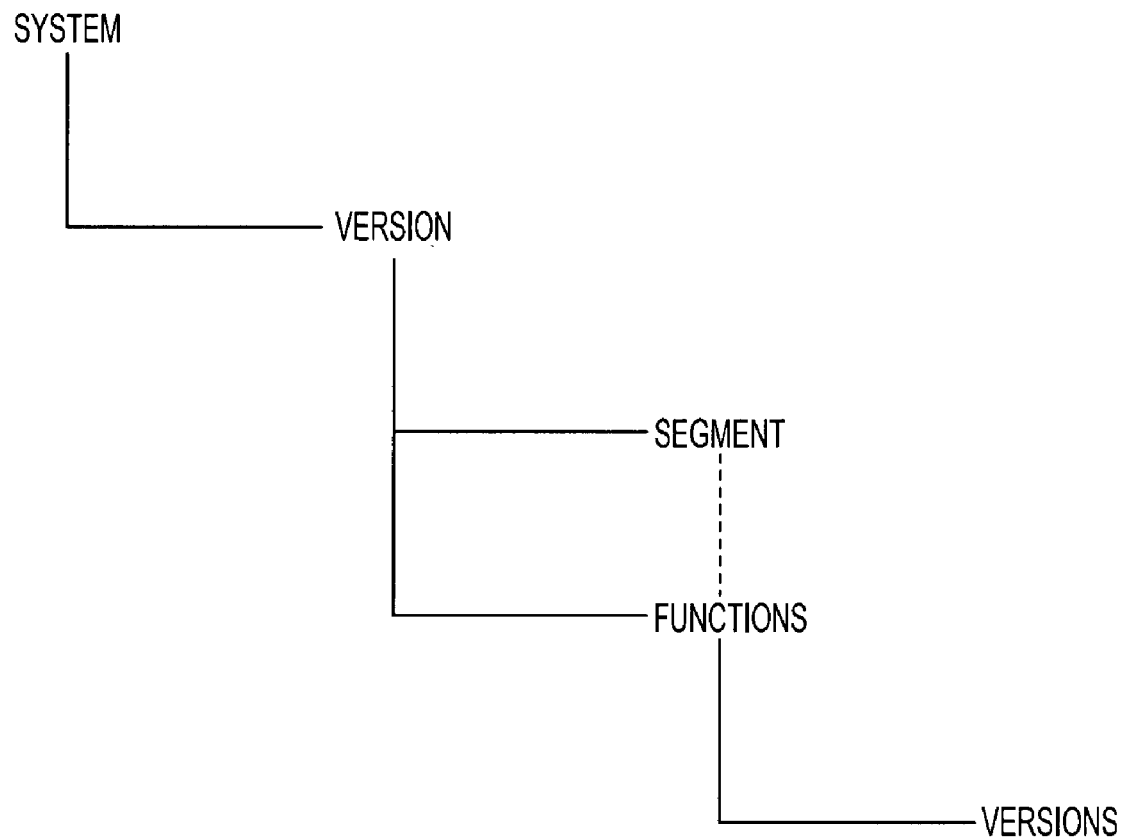
FIG. 17(B) is a diagram illustrating a definition hierarchy having a version level at multiple levels in the definition hierarchy, according to an embodiment of the present invention.

Further, the present invention is not intended to be limited to using versioning at only one level. Instead, versions can be used simultaneously at multiple levels in the definition hierarchy. For example, FIG. 17(B) is a diagram illustrating a definition hierarchy having a version level above and beneath the function level, according to an embodiment of the present invention.

When creating a new strategy version, the new version can be created entirely "from scratch", or can be created by replicating/copying an existing strategy version.

Figure 18A:
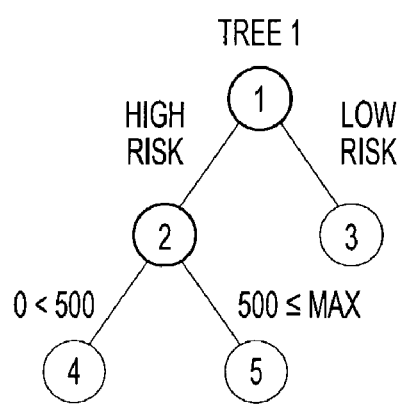
FIGS. 18(A) and 18(B) are diagrams illustrating a modification of a first strategy version to create a second strategy version, according to an embodiment of the present invention.
Figure 18B:
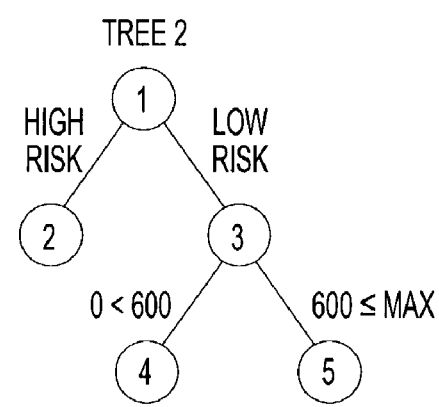

For example, FIGS. 18(A) and 18(B) are diagrams illustrating the editing of a first strategy version to create a second strategy version, according to an embodiment of the present invention. More specifically, FIG. 18(A) illustrates a decision tree (a "function") representing a first strategy version. FIG. 18(B) illustrates a decision tree (a "function") representing a second strategy version which is an edited version of the first strategy version. As can be seen from FIGS. 18(A) and 18(B), nodes 1, 2 and 3 are identical in the first and second strategy versions. However, the branches below nodes 1, 2 and 3 in the first strategy version have been edited so that they are different in the second strategy version.

The concept of inheritance can also be applied to versioning. For example, in FIGS. 18(A) and 18(B), since nodes 1, 2 and 3 are identical, these nodes may be maintained in a "common" version, independent from version 1 or version 2. However, the branches below nodes 2 and 3 as well as nodes 4 and 5 are different. These changes might be implemented and maintained as part of independent versions 1 and 2. When nodes 1, 2 and 3 are displayed and placed into production or part of either tree 1 or tree 2, these nodes are inherited from a "common" version. However, the lower branches and nodes are defined specifically in versions subordinate to the common version, and thus supersede any tree structure below nodes 2 and 3 in the common version. Thus, inheritance can be used to apply a very granular versioning ability where some parts of a strategy, segment, and/or function are maintained and inherited from a common version and others are overridden in more specific versions subordinate to the common version.

Inheritance promotes reuse of strategy components and thus facilitates and centralizes maintenance of common strategy functionality. A subordinate version supporting inheritance supersedes the common version (and thus does not inherit from it) in any area of the strategy where changes are made in the subordinate version.

Figure 19:
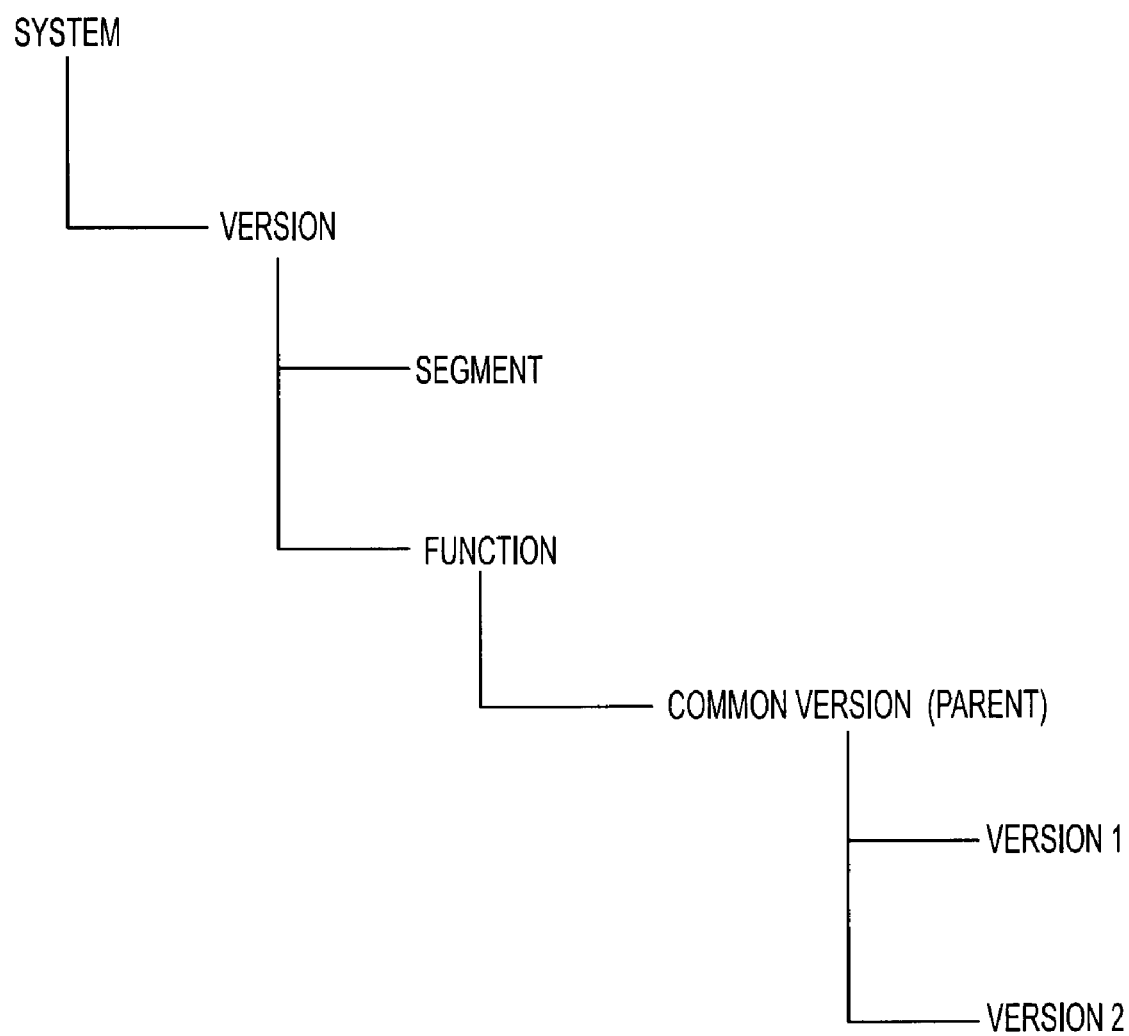
FIG. 19 is a diagram illustrating a definition hierarchy showing the concept of inheritance as applied to versioning in a decision management system, according to a embodiment of the present invention.

For example, FIG. 19 is a diagram illustrating a definition hierarchy showing the concept of inheritance as applied to versioning in a decision management system, according to an embodiment of the present invention. As illustrated by FIG. 19, versions 1 and 2 supersede and inherit from the common version.

Therefore, different strategy versions can be stored, and then individually selected for production and/or simulation. These stored strategy versions can also be edited, where the edited strategies are then stored to represent additional versions. Any of these stored strategy versions can then be further edited, selected, and applied in production and/or simulation. The various strategy versions are stored, for example, in relational tables, and edited, selected and applied via a GUI.

Further, when creating a new strategy version, the new version can be validated to ensure that the new version works properly. For example, validation can include checking to ensure that there are no detached nodes or branches without associated nodes.

Figure 20:
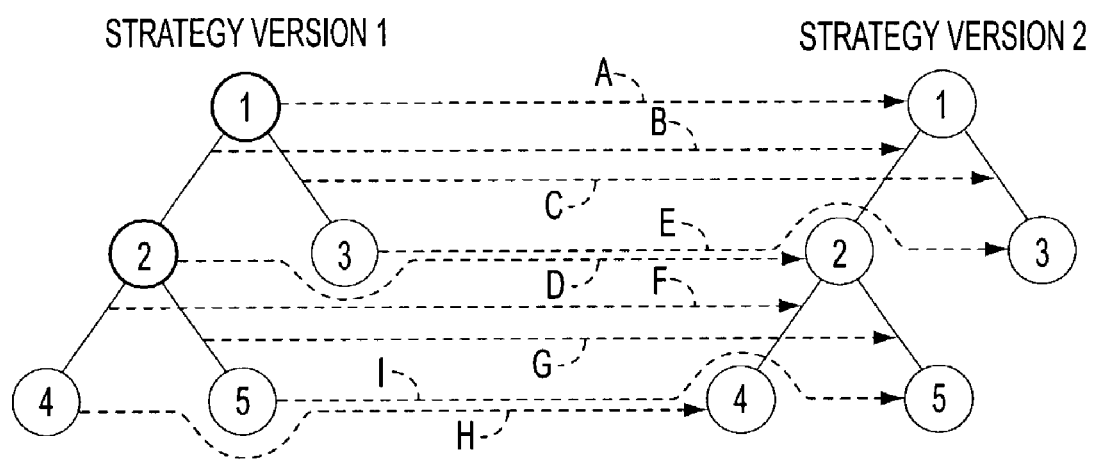
FIG. 20 is a diagram illustrating a validation process, according to an embodiment of the present invention.

FIG. 20 is a diagram illustrating a validation process executed in creating a new version, according to an embodiment of the present invention. Referring now to FIG. 20, strategy version 1 has five nodes, 1, 2, 3, 4 and 5. Strategy version 2 is created by first copying each component (that is, each node and connecting branch) of strategy version 1. For example, as illustrated in FIG. 20, steps A through I are systematically performed to copy the nodes and connecting portions, to thereby form an identical copy of strategy version 1. Copying may start at the root node (that is, node 1) of strategy version 1, and each node and connecting portion would subsequently be copied in an appropriate connection order from the root node. In this manner, it can be ensured that all nodes and connecting portions are properly copied, and that, for example, there are no detached nodes in the copied version. This ensures the integrity of every new version created regardless of whether it is a new version of an entire system, or just a function. After a complete, verified copy of strategy version 1 is obtained, this complete copy can then be edited and saved, to complete strategy version 2. Strategy version 2 can then stored as a separate strategy version.

Validation is important, for example, to ensure that a system user does not start making changes to an incomplete version that was copied from an incomplete strategy component. Such problems can occur, for example, when a version is created by User A before User B has completed his/her work on the "source" version. The above-described validation process will prevent such problems from occurring and thus prevent data corruption in a version that may be difficult to trace. Validation can, however, be optional.

Therefore, different strategy versions can be created and then stored, for example, in a relational database. By interjecting a version level between the system level and the segment level, a system user can, for example, copy a complete set of strategies for manipulating and testing, while maintaining the integrity of production strategies. Versioning can be applied at lower levels in the strategy hierarchy, such as within functions, to further increase flexibility. Moreover, inheritance can be used to implement very sophisticated and granular versioning, but with the introduction of additional complexity.

A decision management system according to the embodiments of the present invention facilitates the management of strategies within a rules based environment. A system user can take a complete set of strategies for a specific business objective and save it as a separate version. Then, different strategies can be referenced for simulation other than the production strategy, if so desired. With multiple versions of strategies, the system user has the ability to alter a given strategy for either simulation or production purposes while maintaining the integrity of the current production strategy.

The various processes, procedures, methods and operations described herein are preferably embodied in software, which can be run on many different hardware configurations.

Figure 21:
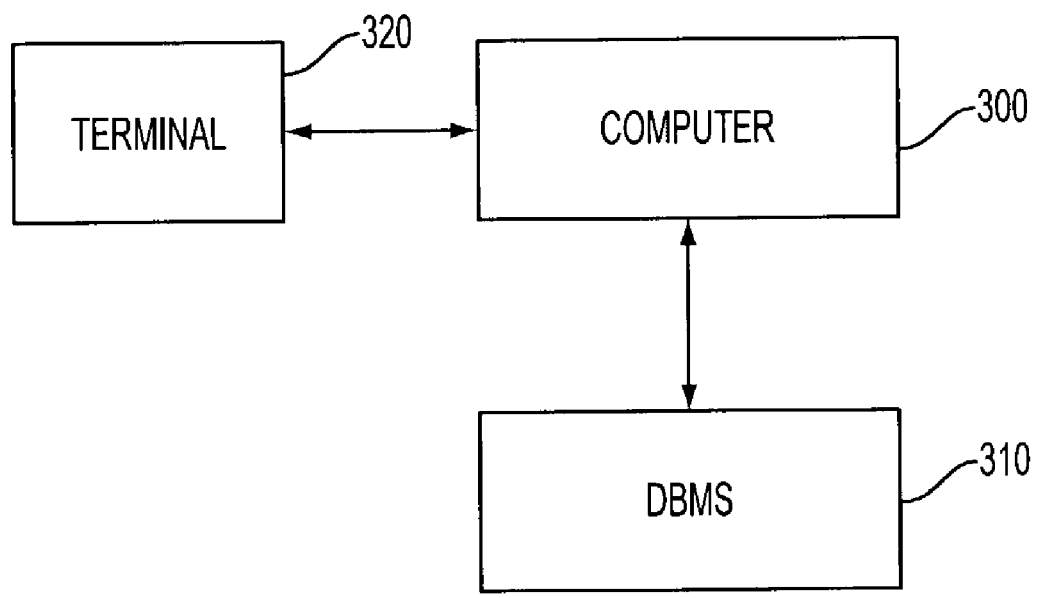
FIG. 21 is a diagram illustrating a simplified hardware architecture of a decision management system, according to an embodiment of the present invention.

FIG. 21 is a diagram illustrating a simplified hardware architecture of a decision management system, according to an embodiment of the present invention. Referring now to FIG. 21, the decision management system is embodied in software stored in a computer-readable medium, such as a memory of a computer 300. Computer 300 can be, for example, a server and associated memory. Computer 300 preferably has access to a data base management system (DBMS) 310 for storing and accessing accumulated data. A user accesses computer 300 possibly via a terminal 320 which can be, for example, a PC. There are many different types of hardware configurations, including many different types of client/server architectures, which can be used. Such hardware configurations would be understood by a person of skill in the art.

Figure 22:
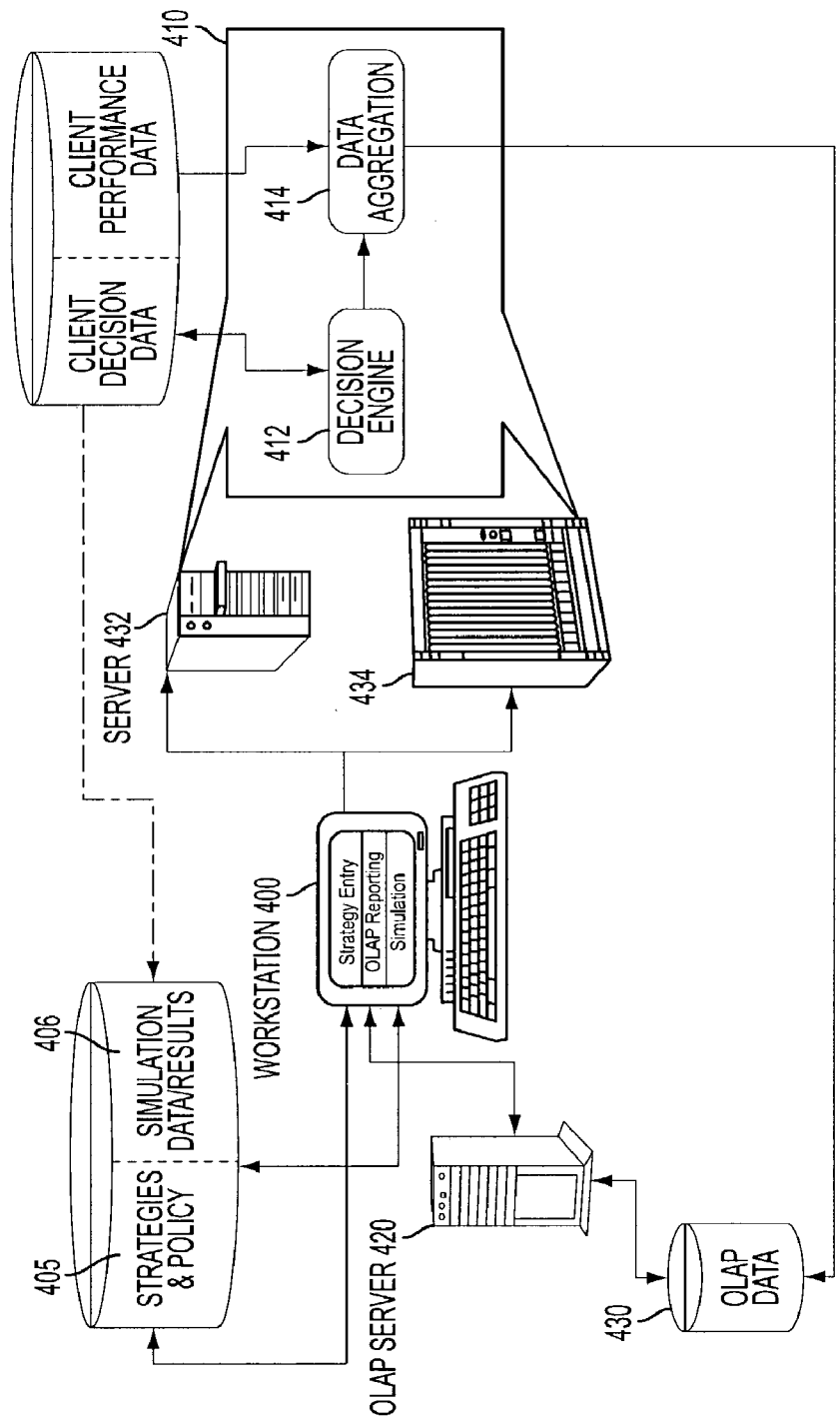
FIG. 22 is a diagram illustrating a more detailed hardware architecture of a decision management system, including the distribution of system software, according to an embodiment of the present invention.

FIG. 22 is a diagram illustrating a more detailed hardware architecture of a decision management system, according to an embodiment of the present invention. Referring now to FIG. 22, a workstation 400 provides a centralized user interface through which a strategy analyst can control the system. The primary purpose of workstation 400 is to enable the entry, maintenance and propagation of decision strategies to a decision engine/data aggregation platform 410 which includes a decision engine 412 and a data aggregation component 414. These strategies reside in a relational data model 405 while they are being edited, maintained, and selected for simulation/production. This same data model thus supports versioning through its structure and interaction with workstation 400. Workstation 400 also provides access to OLAP analysis and reporting systems, possibly via an OLAP server 420, and consistently using an OLAP database 430. A server 432 and a mainframe 434 typically run different processing modes, and provide the processing power for decision engine/data aggregation platform 410.

Decision engine 412 deploys the business decisioning rules entered on workstation 400 against client data. This architecture is highly scaleable and can operate in both on-request or batch processing modes as well as in both mainframe and client/server environments.

Potentially sharing the same environments as decision engine 412 is data aggregation component 414. Data aggregation component 414 is responsible for matching/merging decision engine output (i.e., scores and decisions) with the results of enacting recommendations of decision engine 412. Data aggregation component 414 provides the information that OLAP server 420 accesses to provide strategy performance.

The OLAP portion of the system preferably uses a one to four tier architecture to allow a strategy analyst to do multidimensional analysis on the results of deployed strategies. The OLAP portion of the system can be extremely scaleable through leveraging the following configurations: data resides locally with a graphical reporting user interface (1 tier), data resides independently from the graphical reporting user interface (2 tiers), a server resides between the user interface and the data to expedite query requests and monitor strategy results (3 tiers) and/or a web server resides between the user interface and the OLAP server to enable mass browser-based distribution of reports (4 tiers). OLAP's multidimensional qualities provides analysts with the flexibility to "mine" their results, examining relationships in the data as well as the ability to perform ad hoc calculations and re-format views as required.

Figure 23:
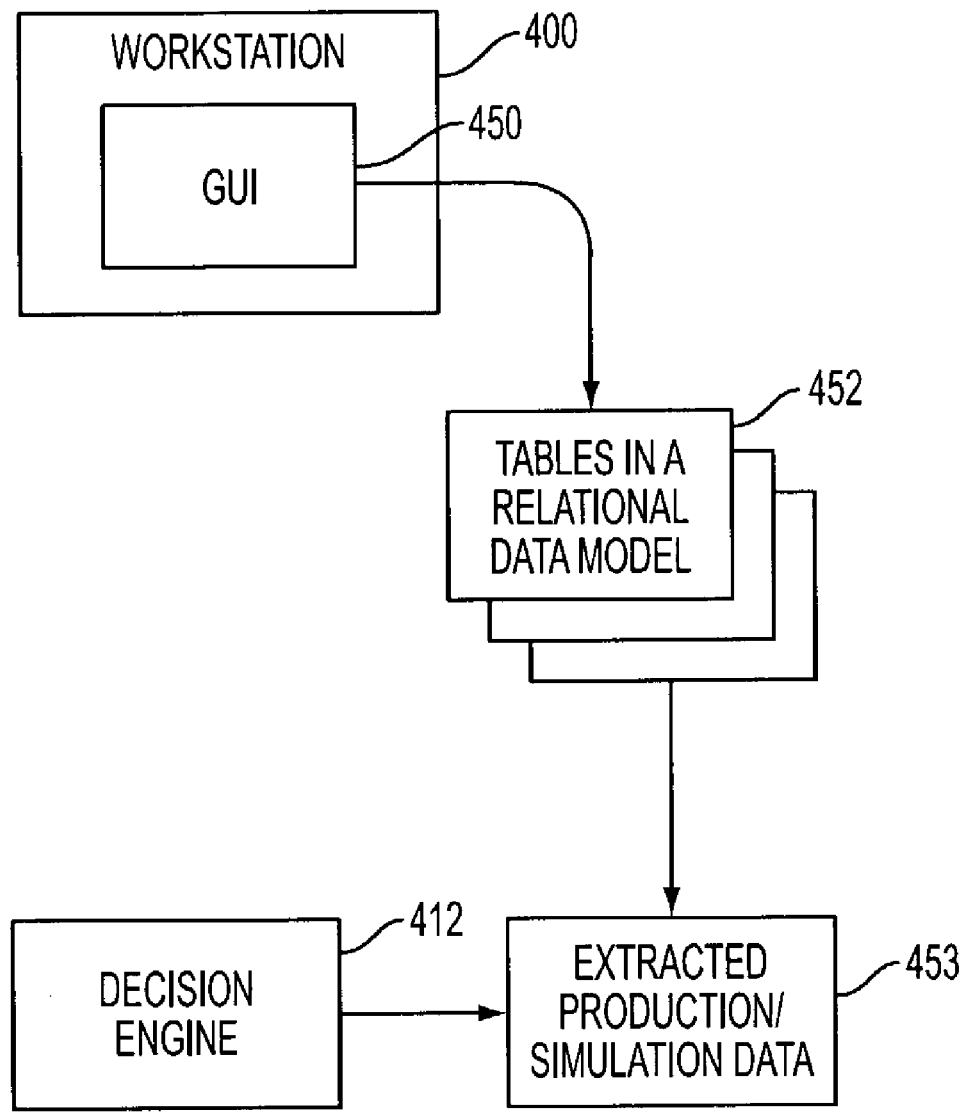
FIG. 23 is a diagram illustrating the use of a GUI and a relational data model, according to an embodiment of the present invention.

FIG. 23 is a diagram illustrating the use of a GUI and tables in a relational data model, according to an embodiment of the present invention. Referring now to FIG. 23, a system user enters strategies, edits strategies, selects strategies, and defines versions, by entering information in a GUI 450 running on workstation 400. The strategies and associated information entered in GUI 450 are stored in a relational data model 452. Decision engine 412 retrieves the extracted strategies and other data from extracted production/simulation data 453, and performs appropriate operations. For example, the information for completing look-up tables 240 and 242 in FIG. 16 can be entered by a system user via GUI 450. The design of a GUI for entering information via relational tables would be understandable by a person of skill in the art. The user also selects, via GUI 450, which version(s) of the strategies/strategy components are extracted to production/simulation data 453.

The use of GUI 450 and look-up tables allow a user to enter, edit, select and apply strategies without technical intervention. Here, the term "without technical intervention" indicates that the strategies can be entered, edited, selected and applied without changes to the software's code or the environment in which it operates that would require a technical understanding of the product's architecture or leveraged technology. In other words, new software code does not have to be written, for example, to create a new version and apply the new version in production. Instead, for example, the creation and application of a new version are driven by the system user through the use of a GUI and relational tables, as well as data propagation software to move the selected version(s) to the simulated production environment. This allows a system user to change versions via, for example, a simple graphical user interface or other type of user interface, instead of requiring a software programmer to create or change the written software code or physically move archived data structures. By allowing versioning to be performed at, for example, a desktop via a GUI, the present invention puts the power of managing the different strategy versions directly in the hands of the system user.

Entering, editing, selecting, and applying strategy versions without technical intervention, as in the present invention, is significantly different than that in the decision management system Strata™ release 2.0 described in the Background of the Invention section. More specifically, Strata™ release 2.0 required technical intervention if a strategy version needed to be saved as a backup in a database. With Strata™ release 2.0, system users had only one strategy version that could be edited at a time. Once the system user committed a strategy version, it was copied and extracted, but could no longer be changed, viewed or edited. Technical intervention was required to save a strategy version in that the data in the relational model would have to be copied using database tools versus being supported by the application. In order to revert back to a previous strategy version for use in production, a procedure for archiving strategies would need to be established where a software programmer copied and archived the committed strategy version prior to committing the edited uncommitted strategy. These archived strategies could be later swapped in for production (again, requiring technical intervention), but could not be altered or edited. By contrast, a decision management system, according to embodiments of the present invention, puts the power of managing the strategy versions in the hands of the system user by interjecting a version level into the definition hierarchy and transferring the control to the desktop. The number of versions is limited solely by storage capacity, not the application. Not only can the system user easily access and edit any strategy version, the user also controls which version will be used for production and/or simulation.

When a strategy version is used for "production", this indicates that the strategy version will be used to actually determine an interaction strategy. More specifically, the strategy version is put into actual use in the evaluation of customer/accounts. By contrast, when a strategy version is used for "simulation", this indicates that the strategy version will be used for testing purposes.

As described above, a respective strategy version can quickly be implemented for simulation and/or production. This is an important advantage of the present invention. For example, assume that a strategy version is being used for production in a collections system. The organization may call clients for collection purposes, based on strategies implemented by the decision management system. Based on a first strategy version in production, the organization may have a list of 50 people which must be called. As soon as a second strategy version is put into production, the new decision management policy may quickly produce a list of 1000 people who must be called immediately, by virtue of the new strategy. The necessity of immediately contacting 1000 people may overwhelm the organization. To rectify the problem, the first strategy version can quickly be put back into production. Moreover, the present invention would allow the second strategy version to be tested in simulation before putting it into production, while the first strategy version is being used in production. Similarly, the second strategy can be corrected even after the first strategy is placed back in production. All of this changing of strategy versions can be accomplished at the desktop by a system user, without requiring technical intervention.

With versioning, the decision management system can store complete, separate strategy versions. Alternatively or additionally, the changes (or "delta") between different versions can be stored and modified. By tracking the changes, it is much easier for the system user to see the differences between each version. For example, a GUI can be used to highlight the differences between versions. For example, a unique color can be used to display on a GUI changes between different strategy versions. Tracking changes requires effectiveness dates/times to be stored in the relational data model.

Further, the decision management system can easily track "who" is making strategy changes. Thus, for example, each time a system user creates a new strategy version, the system can record who made the new version. To do this, a field/column should be added to the system data model in addition to the date/time fields to store a record of who created the new version. The field should be associated with the version. As an example, assume that a first strategy version is being applied in production in January. Changes to the first strategy version are made in February, to create second strategy version. The decision management system can easily track who made the changes from the first strategy version to the second strategy version. Reports or graphical screens can be designed to display this information.

A decision management system is described above as being embodied, for example, in software stored in a computer-readable medium, such as a memory of a computer. However, a computer-readable medium is not intended to be limited to a memory of a computer. Instead, a computer-readable medium can be, for example, a computer disk, an optical disk or any other medium which is readable by a computer.

According to the above embodiments of the present invention, a decision management method and apparatus (a) assigns clients of an organization into categories and test groups so that the clients are conceptually representable in a data structure equivalent to a matrix having first and second axes with the categories on the first axis and the test groups on the second axis, the intersection of each category and test group in the matrix defining a test cell; (b) applies different strategies to clients within different test cells; and (c) tracks the movement of clients between categories as a result of the applied strategies.

As indicated above, the clients are "conceptually representable" in a data structure equivalent to a matrix. Thus, it is not necessary to physically create a matrix. Instead, the strategies should simply be applied to the clients in a manner which corresponds to that "conceptualized" by the matrix.

The test groups and categories are not intended to be limited to the specific examples included herein, and instead can be flexibly designed, for example, based on the business of the organization. For example, Bronze, Gold and Platinum are described herein as being categories. However, the present invention is not intended to be limited to use with these specific category names. Moreover, the applied strategies are not intended to be limited to any specific decision tree structure described herein as an example.

A decision management system according to the above embodiments of the present invention allows strategies to be developed which move clients of an organization from one category of clients to another. Different strategies are applied to clients within different strategy test cells. Then, the movement of clients between strategy test cells can be monitored, so that the strategies can be appropriately modified to control the movement of clients between categories.

The present invention is not intended to be limited to controlling the movement of clients across categories, and movement is not the only reason to apply strategies. Instead, strategies can be applied, for example, simply to increase the client value over time to the organization. For example, two distinct report groups may result in different delinquency rates for clients of a company. Changing the overall strategy to include the strategy which yields the lower delinquency rate does not necessarily imply movement of a client across client categories. The client may stay, for example, in a "Bronze" category, but the overall effectiveness of the portfolio of clients may have been statistically improved. Therefore, in this example, the client value over time to the company has been increased.

The present invention relates to a rules based decision management system. Here, the terms "decision management system" or "rules based decision management system" refer to computer implemented systems which apply strategies to determine actions to be taken, monitor performance based on the taken actions, and refine the strategies in accordance with the monitored performance.

Moreover, the present invention is not intended to be limited to the overall operations and sequence in FIG. 8. Instead, FIG. 8 is only intended to represent a specific example of a decision management system. There are many other decision management systems which perform different operations for different purposes, and to which the present invention applies.

The present invention relates to the storing, editing, selecting and applying different strategy versions. Here, a "strategy version" is not intended to be limited to any specific type of strategy, or any specific portion of the overall strategy of the decision management system. Therefore, a strategy version can refer, for example, to the strategy defined in a respective function, the strategy associated with a respective function set, the strategy defined for a respective system, or the strategy of all components of the system taken together.

According to the above embodiments of the present invention, strategy versions are stored in a relational data model using tables/look-up tables. However, the present invention is not intended to be limited to the use of "look-up tables" or relational data models, and other appropriate data storage devices and techniques can be used to store strategy versions, so that the strategy versions can be selected, edited and applied without technical intervention.

A decision management system according to the above embodiments of the present invention is significantly different and more evolved than the system described in FIGS. 1-7. For example, the system described in FIGS. 1-7 does not create or conceptualize a data structure equivalent to a matrix of categories and test groups, and thereby does not allow different strategies to be applied to different strategy test cells of the matrix. Further, a system as described in FIGS. 1-7 does not track movement of clients between categories, or modify strategies based on the tracked movement to control movement of clients between categories. In addition, a system as described in FIGS. 1-7 does not interject a versioning level between the system level and the segment level or elsewhere in the definition hierarchy, to provide strategy versioning. Therefore, a system as in FIGS. 1-7 cannot provide advantages of the present invention. Instead, it is limited to very tactical analysis and has relatively reduced flexibility and maintainability.

The many features and advantages of the invention are apparent from the detailed specification and, thus, it is intended by the appended claims to cover all such features and advantages of the invention which fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

What is claimed is:

1. A computer implemented process comprising:

storing first and second strategy versions for application by a computer-implemented decision management system to determine actions to be taken with respect to clients of an organization, the second strategy version being an edited version of the first strategy version and including a function;

storing first and second function versions of the function;

selecting the stored, second strategy version with one of the first and second function versions; and applying the selected second strategy version with said one of the first and second function versions by the decision management system so that the decision management system applies the second strategy version with said one of the first and second function versions by a computer to determine actions to be taken with respect to the clients, monitors results of the applied second strategy version with said one of the first and second function versions by a computer, and refines the second strategy version with said one of the first and second function versions in accordance with the monitored results to increase client value over time to the organization, wherein said selecting and applying are performed without technical intervention via stored information relating to the first and second strategy versions.

2. A process as in claim 1, further comprising:

editing the stored, second strategy version before being applied by the decision management system.

3. A process as in claim 1, further comprising, before the second strategy version is selected by said selecting:
  editing the stored, second strategy version; and
  storing the edited second strategy version, wherein said selecting selects the stored, edited second strategy version, and said applying applies the selected, edited second strategy version by the decision management system.

4. A process as in claim 1, wherein the stored, second strategy version includes only modifications between the first and second strategy versions.

5. A process as in claim 1, further comprising:
  entering the first and second strategy versions via a graphical user interface, wherein
    said storing the first and second strategy versions comprises storing the entered first and second strategy versions in relational tables relating components of the first and second strategy versions together, and
    said applying comprises referring to the relational tables to apply the selected second strategy version, to thereby allow said selecting and applying to be performed without technical intervention.

6. A process as in claim 1, further comprising:
  validating the second strategy version before being applied by the decision management system, said validating including
    copying the first strategy version by systematically copying each component of the first strategy version and the relationships between components to form a copy of the first strategy version,
    validating that the copy of the first strategy version is accurate, and
    saving the validated copy of the first strategy version, to thereby create the second strategy version.

7. A process as in claim 1, further comprising:
  entering the first and second strategy versions via a graphical user interface, wherein
  said storing comprises storing the entered first and second strategy versions in data structures of a relational data model which relates components of the first and second strategy versions together, and
  said applying comprises referring to the data structures to apply the selected second strategy version, to thereby allow said selecting and applying to be performed without technical intervention.

8. A process as in claim 1, wherein each of the first and second strategy versions is a version formed by versioning simultaneously at multiple levels in a definition hierarchy of the decision management system.

9. A process as in claim 1, wherein the function is one of a decision tree, a score model, a matrix, a user exit and a list processor.

10. A process as in claim 1, wherein the function is a decision tree.

11. A process as in claim 5, wherein the function is one of a decision tree, a score model, a matrix, a user exit and a list processor.

12. A process as in claim 7, wherein the function is one of a decision tree, a score model, a matrix, a user exit and a list processor.

13. A computer implemented process comprising:
  creating a first strategy version for application by a computer-implemented decision management system to determine actions to be taken with respect to clients of an organization;
  editing the first strategy version while maintaining the first strategy version as a strategy version separate from the edited first strategy version, the edited first strategy version including a function and being defined as a second strategy version for application by the decision management system to determine actions to be taken with respect to the clients;
  storing first and second function versions of the function;
  selecting one of the first and second strategy versions with one of the first and second function versions; and
  applying the selected one of the first and second strategy versions with said one of the first and second functions versions by the decision management system so that the decision management system applies the selected one of the first and second strategy versions with said one of the first and second function versions by a computer to determine actions to be taken with respect to the clients, monitors results of the applied selected one of the first and second strategy versions with said one of the first and second function versions by a computer, and refines the selected one of the first and second strategy versions with said one of the first and second function versions in accordance with the monitored results to increase client value over time to the organization, wherein said editing, selecting and applying are performed without technical intervention via stored information relating to the first and second strategy versions.

14. A process as in claim 13, further comprising:
  providing a graphical user interface which allows a system user to create, edit and select strategy versions;
  entering the first strategy version via the graphical user interface; and
  storing the entered first strategy version in relational tables of a relational data model, wherein
    said editing comprises referring to the relational tables to obtain and edit the first strategy version, and storing the edited first strategy as the second strategy version in the relational data model, and
    said applying refers to the relational data model to apply the selected one of the first and second strategy versions, to thereby allow said selecting and applying to be performed without technical intervention.

15. A process as in claim 13, further comprising:
  validating the second strategy version before the second strategy version is applied by the decision management system, said validating including
    copying the first strategy version by systematically copying each component of the first strategy version and the relationships between components to form a copy of the first strategy version,
    validating that the copy of the first strategy version is accurate, and
    saving the validated copy of the first strategy version, to thereby create the second strategy version.

16. A process as in claim 13, wherein the function is one of a decision tree, a score model, a matrix, a user exit and a list processor.

17. A process as in claim 13, wherein the function is a decision tree.

18. A computer implemented process comprising:
  creating first and second strategy versions for application by a computer-implemented decision management system to determine actions to be taken with respect to clients of an organization, the second strategy version including a function and being an edited version of the first strategy version;

storing the first and second strategy versions in a relational data model relating components of the first and second strategy versions together;

storing first and second function versions of the function;

selecting the stored, second strategy version with one of the first and second function versions; and applying the selected second strategy version with said one of the first and second function versions by the decision management system by referring to the relational data model so that the decision management system applies the second strategy version with said one of the first and second function versions by a computer to determine actions to be taken with respect to the clients, monitors results of the applied second strategy version with said one of the first and second function versions by a computer, and refines the second strategy version with said one of the first and second function versions in accordance with the monitored results to increase client value over time to the organization.

19. A process as in claim 18, wherein the function is one of a decision tree, a score model, a matrix, a user exit and a list processor.

20. A process as in claim 18, wherein the function is a decision tree.

21. A computer implemented process comprising:

creating a first strategy version for application by a computer-implemented decision management system to determine actions to be taken with respect to clients of an organization, the first strategy version including a function;

storing the created first strategy version in a relational data model;

editing the first strategy version while maintaining the first strategy version as a strategy version separate from the edited first strategy version, the edited first strategy version being defined as a second strategy version for application by the decision management system to determine actions to be taken with respect to the clients;

storing the second strategy version in the relational data model in a manner which relates components of the first and second strategy versions together;

storing first and second function versions of the function;

selecting one of the first and second strategy versions with one of the first and second function versions; and applying the selected one of the first and second strategy versions with said one of the first and second function versions by the decision management system by referring to the relational data model so that the decision management system applies the selected one of the first and second strategy versions with said one of the first and second function versions by a computer to determine actions to be taken with respect to the clients, monitors results of the applied selected one of the first and second strategy versions with said one of the first and second function versions by a computer, and refines the selected one of the first and second strategy versions with said one of the first and second function versions in accordance with the monitored results to increase client value over time to the organization.

22. A process as in claim 21, wherein the function is one of a decision tree, a score model, a matrix, a user exit and a list processor.

23. A process as in claim 21, wherein the function is a decision tree.

24. An apparatus comprising:

means for storing first and second strategy versions for application by a computer-implemented decision management system to determine actions to be taken with respect to clients of an organization, the second strategy version being an edited version of the first strategy version and including a function;

means for storing first and second function versions of the function;

means for selecting the stored, second strategy version with one of the first and second function versions; and means for applying the selected second strategy version with said one of the first and second function versions by the decision management system so that the decision management system applies the second strategy version with said one of the first and second function versions by a computer to determine actions to be taken with respect to the clients, monitors results of the applied second strategy version by a computer, and refines the second strategy version in accordance with the monitored results to increase client value over time to the organization, wherein said selecting and applying are performed without technical intervention via stored information relating to the first and second strategy versions.

25. An apparatus as in claim 24, wherein the function is one of a decision tree, a score model, a matrix, a user exit and a list processor.

26. A process as in claim 24, wherein the function is a decision tree.

27. An apparatus comprising:

means for creating a first strategy version for application by a computer-implemented decision management system to determine actions to be taken with respect to clients of an organization;

means for editing the first strategy version while maintaining the first strategy version as a strategy version separate from the edited first strategy version, the edited first strategy version including a function and being defined as a second strategy version for application by the decision management system to determine actions to be taken with respect to the clients;

means for storing first and second function versions of the function;

means for selecting one of the first and second strategy versions with one of the first and second function versions; and means for applying the selected one of the first and second strategy versions with said one of the first and second functions versions by the decision management system so that the decision management system applies the selected one of the first and second strategy versions with said one of the first and second function versions by a computer to determine actions to be taken with respect to the clients, monitors results of the applied selected one of the first and second strategy versions with said one of the first and second function versions by a computer, and refines the selected one of the first and second strategy versions with said one of the first and second function versions in accordance with the monitored results to increase client value over time to the organization, wherein said editing, selecting and applying are performed without technical intervention via stored information relating to the first and second strategy versions.

28. An apparatus as in claim 27, wherein the function is one of a decision tree, a score model, a matrix, a user exit and a list processor.

29. An apparatus as in claim 27, wherein the function is a decision tree.

30. A computer implemented process comprising:

selecting, with technical intervention, one of first and second strategy versions for application by a computer-implemented decision management system, each of the first and second strategy versions being formed by versioning simultaneously at multiple levels in a definition hierarchy of the decision management system; and applying, without technical intervention, the selected one of the first and second strategy versions by the decision management system so that the decision management system applies the selected version by a computer to determine actions to be taken with respect to clients of an organization, monitors results of the applied version by a computer, and refines the applied version in accordance with the monitored results to increase client value over time to the organization.

31. A process as in claim 30, wherein the selected one of the first and second strategy versions is the second version, the second version is an edited version of the first version, and the second version includes different versions of a function of the second version.

32. A process as in claim 30, wherein the selected version includes different versions of a function of the selected version.

33. A process as in claim 32, wherein the function is one of a decision tree, a score model, a matrix, a user exit and a list processor.

34. A process as in claim 32, wherein the function is a decision tree.

35. An apparatus comprising:

means for selecting, with technical intervention, one of first and second strategy versions for application by a computer-implemented decision management system, each of the first and second strategy versions being formed by versioning simultaneously at multiple levels in a definition hierarchy of the decision management system; and means for applying, without technical intervention, the selected one of the first and second strategy versions by the decision management system so that the decision management system applies the selected version by a computer to determine actions to be taken with respect to clients of an organization, monitors results of the applied version by a computer, and refines the applied version in accordance with the monitored results to increase client value over time to the organization.

36. An apparatus as in claim 35, wherein the selected one of the first and second strategy versions is the second version, the second version is an edited version of the first version, and the second version includes different versions of a function of the second version.

37. An apparatus as in claim 35, wherein the selected version includes different versions of a function of the selected version.

38. An apparatus as in claim 37, wherein the function is one of a decision tree, a score model, a matrix, a user exit and a list processor.

39. A process as in claim 37, wherein the function is a decision tree.

* * * * *

UNITED STATES PATENT AND TRADEMARK OFFICE
CERTIFICATE OF CORRECTION

PATENT NO. : 7,318,224 B2
APPLICATION NO. : 10/358158
DATED : January 8, 2008
INVENTOR(S) : Laurence Honarvar et al.

It is certified that error appears in the above-identified patent and that said Letters Patent is hereby corrected as shown below:

Col. 8, line 11, delete "a" and insert --an--, therefor. Second occurrence.

Col. 9, line 46, delete "5" and insert --5,--, therefor.

Col. 18, line 59, after "to" delete "a" and insert --an--, therefor. Second occurrence.

Signed and Sealed this

Twenty-seventh Day of May, 2008

JON W. DUDAS
*Director of the United States Patent and Trademark Office*